(12) United States Patent
Vance

(10) Patent No.: US 12,195,264 B2
(45) Date of Patent: Jan. 14, 2025

(54) INSULATED CONTAINER AND METHOD OF FORMING AND LOADING AN INSULATED CONTAINER

(71) Applicant: David K. Vance, Concord, NC (US)

(72) Inventor: David K. Vance, Concord, NC (US)

(*) Notice: Subject to any disclaimer, the term of this patent is extended or adjusted under 35 U.S.C. 154(b) by 0 days.

(21) Appl. No.: 18/455,195

(22) Filed: Aug. 24, 2023

(65) Prior Publication Data
US 2023/0399163 A1 Dec. 14, 2023

Related U.S. Application Data

(62) Division of application No. 17/552,408, filed on Dec. 16, 2021, now Pat. No. 11,772,872.

(60) Provisional application No. 63/132,326, filed on Dec. 30, 2020.

(51) Int. Cl.
| | | |
|---|---|---|
| B31B 50/00 | (2017.01) | |
| B31B 50/81 | (2017.01) | |
| B65D 65/46 | (2006.01) | |
| B65D 81/38 | (2006.01) | |
| B31B 120/40 | (2017.01) | |

(52) U.S. Cl.
CPC ........ B65D 81/3813 (2013.01); B31B 50/812 (2017.08); B65D 65/466 (2013.01); *B31B 2120/407* (2017.08)

(58) Field of Classification Search
CPC .................. B65D 81/3813; B65D 81/3862
See application file for complete search history.

(56) References Cited

U.S. PATENT DOCUMENTS

| | | | |
|---|---|---|---|
| 6,443,309 B1 | 9/2002 | Becker | |
| 8,763,811 B2* | 7/2014 | Lantz | B65D 65/466 |
| | | | 206/584 |
| 9,751,683 B1* | 9/2017 | Jobe | B65D 81/3813 |
| D798,717 S | 10/2017 | Rapp | |
| 10,112,756 B2 | 10/2018 | Menzel, Jr. | |
| 10,246,236 B2 | 4/2019 | Menzel, Jr. | |
| D864,721 S | 10/2019 | Menzel, Jr. | |
| 10,676,263 B2 | 6/2020 | Menzel, Jr. | |
| D907,496 S | 1/2021 | Menzel, Jr. | |
| 2012/0248101 A1 | 10/2012 | Tumber et al. | |
| 2016/0325915 A1* | 11/2016 | Aksan | B65D 81/3862 |
| 2016/0355296 A1 | 12/2016 | Baker et al. | |
| 2017/0283157 A1* | 10/2017 | Jobe | B65D 5/64 |
| 2018/0086538 A1* | 3/2018 | Jobe | B65D 81/3813 |

(Continued)

FOREIGN PATENT DOCUMENTS

| | | |
|---|---|---|
| WO | 2016151310 | 9/2016 |
| WO | 2016176271 | 11/2016 |

(Continued)

OTHER PUBLICATIONS

Notification of Refusal, International Registration No. DM/213008, U.S. Appl. No. 35/511,537 (Mar. 29, 2022).

(Continued)

*Primary Examiner* — Eyamindae C Jallow
(74) *Attorney, Agent, or Firm* — Robinson IP Law, PLLC

(57) ABSTRACT

An insulated shipping container and method of forming and loading an insulated container utilizing sustainable materials including recycled post-industrial, pre-consumer natural fiber, plant-based fiber and synthetic fiber to include recycled polyethylene terephthalate (PET).

26 Claims, 33 Drawing Sheets

(56) References Cited

U.S. PATENT DOCUMENTS

| | | | |
|---|---|---|---|
| 2018/0093816 A1 | 4/2018 | Longley | |
| 2018/0194534 A1* | 7/2018 | Jobe | B65D 5/56 |
| 2018/0229917 A1* | 8/2018 | Jobe | B32B 9/02 |
| 2018/0257844 A1* | 9/2018 | s, Jr. | B65D 81/3862 |
| 2018/0290813 A1 | 10/2018 | Waltermire | |
| 2018/0334308 A1 | 11/2018 | Moore | |
| 2019/0248573 A1 | 8/2019 | Collison et al. | |
| 2019/0352077 A1 | 11/2019 | Carter | |
| 2019/0367208 A1* | 12/2019 | Jobe | B65D 65/466 |
| 2019/0367209 A1* | 12/2019 | Jobe | B65D 81/3834 |
| 2020/0156852 A1 | 5/2020 | Veish | |
| 2020/0270052 A1 | 8/2020 | Aksan et al. | |
| 2020/0385195 A1* | 12/2020 | Lyons | B65D 5/325 |
| 2020/0407147 A1 | 12/2020 | Jobe | |

FOREIGN PATENT DOCUMENTS

| | | |
|---|---|---|
| WO | 2016203343 | 12/2016 |
| WO | 2019125511 | 6/2019 |

OTHER PUBLICATIONS

Standard Test Method for Determining Anaerobic Biodegradation of Plastic Materials Under High-Solids Anaerobic- Digestion Conditions, ASTM International test D5511-11 (Feb. 2011).
Standard Test Method for Determining Anaerobic Biodegradation of Plastic Materials Under High-Solids Anaerobic- Digestion Conditions, ASTM International test D5511-12 (Jun. 2012).
Standard Test Method for Determining Anaerobic Biodegradation of Plastic Materials Under High-Solids Anaerobic-Digestion Conditions, ASTM International test D5511-18 (Feb. 2018).

* cited by examiner

INSULATED CONTAINER AND METHOD OF FORMING AND LOADING AN INSULATED CONTAINER

CROSS-REFERENCE(S) TO RELATED APPLICATION(S)

This application is a division of U.S. patent application Ser. No. 17/552,408, filed on Dec. 16, 2021, which claims priority to U.S. Provisional Patent Application No. 63/132,326 entitled "INSULATED CONTAINER" which was filed on Dec. 30, 2020, the entire contents of which are incorporated herein by reference.

This application further expressly incorporates by reference the following patent publications in their entireties: U.S. Pat. Nos. 10,112,756; 10,246,236; 10,676,263; US Patent Publication 2018/0257844 A1; and International Patent Publication WO 2019/125511 A1. Applicant also incorporates by reference the entirety of the following ASTM standards publications: ASTM DD511-18; ASTM D5511-12; ASTM D5511-11.

FIELD

This disclosure relates to the field of containers. More particularly, this disclosure relates to insulated containers. More particularly, the present invention relates to the field of insulated shipping containers utilizing sustainable materials including recycled post-industrial, pre-consumer natural fiber, plant-based fiber and synthetic fiber to include recycled polyethylene terephthalate (PET). The containers according to the present invention may be used in transporting and storing objects which may be at a temperature that is different from the temperature outside the container. In addition to stability, an aspect of the present invention relates to manufacture and assembly which achieves unexpected efficiencies.

BACKGROUND

There is a long felt need in the art for a packaging material which affords safe transportation of temperature sensitive materials, which has a consistent density, which maintains an internal temperature relative to an external temperature, which is efficiently and economically manufactured, which is efficiently and economically assembled for shipment, which is lightweight, and which minimizes negative impacts to the environment. There is an equally long felt need in the art for an insulated container that may be efficiently manufactured and loaded.

SUMMARY

The present invention is an insulated shipping container which affords safe transportation of temperature sensitive products, which has a consistent density, which maintains an internal temperature relative to an external temperature, which is efficiently and economically manufactured, assembled, and loaded, which is lightweight, and which minimizes harmful impacts to the environment.

The present invention utilizes recycled post-industrial, pre-consumer natural fiber, plant-based fiber, synthetic fiber and recycled polyethylene terephthalate (PET) fiber. Post-industrial, pre-consumer cotton and synthetic waste may include fiber material gleaned and/or trimmed as part of cotton and synthetic material manufacturing and converting process. Such fiber material, collected from the manufacturing process, may contain small pieces of cotton seed pods and stems removed as part of the manufacturing process. These fiber materials may or may not have been converted into finished products (such as clothing or other fabrics).

However, the invention is not limited only to waste generated from a single manufacturing or converting process. As such, post-industrial, pre-consumer waste may be from raw cotton processing, cotton yarn manufacturing, cotton fabric manufacturing, synthetic fabric manufacturing, plastic recycling process and related processes such as carding, airlay, garneting, and other similar methods of manufacturing.

Accordingly, the present invention is directed to an insulated container that may have a rigid container having a bottom, front, rear, left, and right sides, and a selectively closable top side. The bottom and top sides may have substantially a same length and width as one another. The left and right sides may have a substantially same height and width as one another. The front and rear sides may have a substantially same height and width as one another. The insulated container may also include a first insulated pad having a quantity of post-industrial, pre-consumer cotton waste and/or synthetic waste having a predetermined thickness and density, having a length and a width, and having a perimeter calculated by adding the length and the width and multiplying by two. The insulated container may have a second insulated pad identical to the first insulated pad. The insulated container may have a third insulated pad having a quantity of post-industrial, pre-consumer cotton waste and or synthetic waste, having the same thickness and density as the first insulated pad, and having a length that is longer than the width of the first insulated pad, but is shorter than the perimeter of the first insulated pad. The insulated container may be constructed such that the first insulated pad is positioned inside the rigid container in contact with the bottom of the rigid container, the third insulated pad is positioned perpendicular to the first insulated pad and is in contact with the front, rear, left, and right sides of the rigid container, and second insulated pad is positioned atop the third insulated pad.

According to another embodiment of the invention, the insulated container has exactly three insulated pads. That is, not one pad, not two pads, not four or more pads but exactly three insulated pads, no more, no less.

According to another embodiment of the invention, each of the first, second, and third insulated pads further may include a natural fiber or synthetic lamination layer attached to top and bottom surfaces but not to any edge surfaces of the respective insulated pad.

According to another embodiment of the invention, each of the first, second, and third insulation pads may be characterized by a lack of any covering or lamination on respective top and bottom surfaces.

According to another embodiment of the invention, the insulated container may include a biodegradable or recyclable poly-wrap enclosure around each of the respective first, second, and third insulated pads.

According to another embodiment of the invention, the term biodegradable may be defined to mean that each of the respective first, second, and third insulated pads will biodegrade completely within one year or less.

According to another embodiment of the invention, the height of each one of the front, rear, left, and right sides of the rigid container may be substantially the same as a combined height of the thickness of the first and second insulated pads and a width of the third insulated pad.

According to another embodiment of the invention, the height of each one of the front, rear, left, and right sides of the rigid container may be substantially longer than a combined height of the thickness of the first and second insulated pads and a width of the third insulated pad when the respective first, second, and third pads are positioned in the rigid container, wherein an uninsulated void is formed above the second insulated pad and below the top side of the rigid container.

According to another embodiment of the invention, one or more objects may be positioned in the uninsulated void wherein each one of the one or more objects is stable at ambient temperature.

According to another embodiment of the invention, the one or more objects placed in the uninsulated void may include one or more of: gloves, syringes, tourniquets, medication, bandages, wipes, napkins, alcohol, paper, printed instructions, kitchen or table utensils, serving ware, cookware, fruit, vegetables, herbs, and/or seasonings.

According to another embodiment of the invention, the insulated pads may biodegrade completely when subjected to the conditions set forth in ASTM D5511-18.

According to a method of the invention, a method of forming and loading an insulated container may include the steps of providing a rigid container having a bottom, front, rear, left, and right sides, and a selectively closable top side wherein the bottom and top sides have substantially the same length and width as one another, wherein the left and right sides have substantially the same height and width as one another, and wherein the front and rear sides have substantially the same height and width as one another. Another step of the method may include providing a quantity of post-industrial, pre-consumer cotton or synthetic waste. Another step of the method of the invention may include providing a processing machine, selected from the group consisting of carding, airlay, and needle punch, configured to process post-industrial, pre-consumer cotton or synthetic waste into a continuous non-woven sheet having predetermined width, thickness, and density. A further step may include providing a knife device configured to crosscut the continuous sheet at predetermined intervals thereby forming insulated pads each time the knife crosscuts the continuous sheet, wherein each of the insulated pads has a top surface, a bottom surface, and four edge surfaces. Another step may include feeding the post-industrial, pre-consumer cotton and synthetic waste into the processing machine. Another step may include cutting the continuous sheet as the continuous sheet exits the processing machine with the knife device to form a first insulated pad, a second insulated pad, and a third insulated pad, wherein the first and second insulated pads have identical lengths and identical widths, and the third insulated pad has a length that is longer than the length of the first insulated pad but shorter than a perimeter of the first insulated pad where the perimeter of the first insulated pad is calculated by adding the length and the width of the first insulated pad and multiplying by two. Another step may include placing the first insulated pad into the rigid container such that the bottom surface of the first insulated pad rests on the bottom side of the container. Another step may include placing the third insulated pad into the rigid container and folding the third insulated pad along three parallel fold lines such that the bottom surface of the third insulated pad contacts the front, rear, left, and right sides of the rigid container and the top surface of the third insulated pad faces an interior of the insulated container, and such that a bottom edge of the third insulated pad rests on the top surface of the first insulated pad. Another step may include loading a thermally sensitive object into the container wherein the thermally sensitive object contacts the top surfaces of the first and/or third insulated pads. Another step may include loading a cold pack into the container wherein the cold pack contacts the top surfaces of the first and/or the third insulated pads. Another step may include placing the second insulated pad into the rigid container such that the top surface of the second insulated pad rests on, and is supported by, the top edge of the third insulated pad, wherein collectively the first, second, and third insulated pads form an insulated enclosure within the rigid container. A final step may include closing the top side of rigid container. According to such a method, each one of the respective first, second, and third insulated pads are biodegradable in an anaerobic environment or recyclable.

According to another aspect of the method, the processing machine may further apply a natural fiber lamination layer to the top and bottom surfaces of the continuous pad, but not to any edge surfaces of the continuous pad.

According to another aspect of the method, an additional step may include applying a biodegradable or recyclable poly-wrap enclosure around each of the respective first, second, and third insulated pads.

According to another aspect of the method, a height of each one of the front, rear, left, and right sides of the rigid container may substantially be the same as a combined height of the thickness of the first and second insulated pads and the width of the third insulated pad after placement of the respective first, second, and third pads in the rigid container.

According to another embodiment of the method, the height of each one of the front, rear, left, and right sides of the rigid container may be substantially longer than a combined height of the thickness of the first and second insulated pads and the width of the third insulated pad after placement of the respective first, second, and third pads in the rigid container, wherein an uninsulated void is formed above second insulated pad and below the top side of the rigid container. According to such an embodiment, a further step may include placing one or more objects in the uninsulated void wherein each one of the one or more objects is stable at ambient temperature. According to a still further aspect of the method, the one or more objects placed in the uninsulated void may include one or more of: gloves, syringes, tourniquets, medication, bandages, wipes, napkins, alcohol, paper, printed instructions, kitchen or table utensils, serving ware, cookware, fruit, vegetables, herbs, condiments, and/or seasonings.

The summary provided herein is intended to provide examples of particular disclosed embodiments and is not intended to cover all potential embodiments or combinations of embodiments. Therefore, this summary is not intended to limit the scope of the invention disclosure in any way, a function which is reserved for the appended claims.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

The figures are provided to illustrate concepts of the invention disclosure and are not intended to embody all potential embodiments of the invention. Therefore, the figures are not intended to limit the scope of the invention disclosure in any way, a function which is reserved for the appended claims.

DETAILED DESCRIPTION

Figure 1:
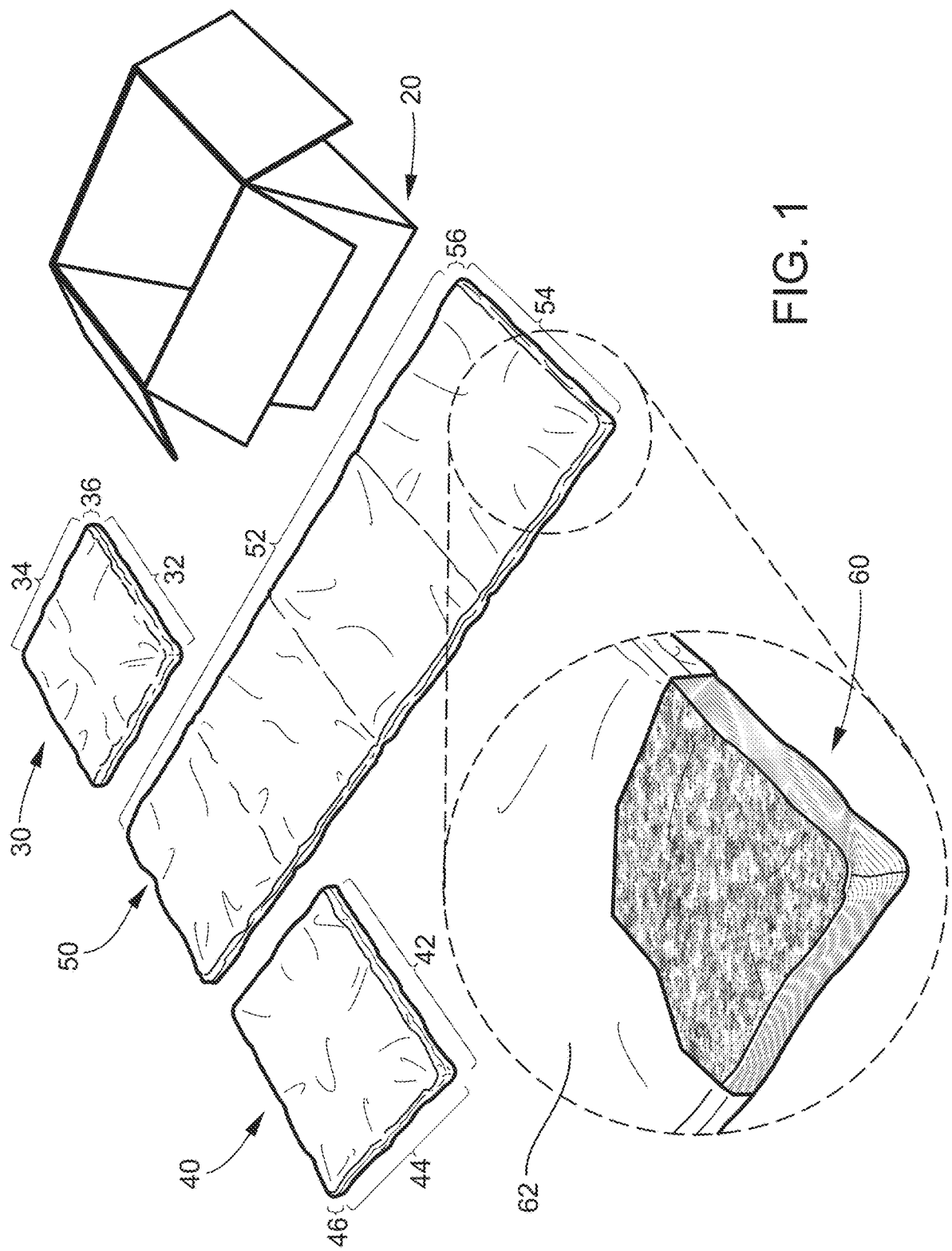
FIG. 1 is a perspective view of an embodiment of the invention in the unassembled state and highlighting the insulated pad which is enclosed in a poly-wrap.
Figure 2:
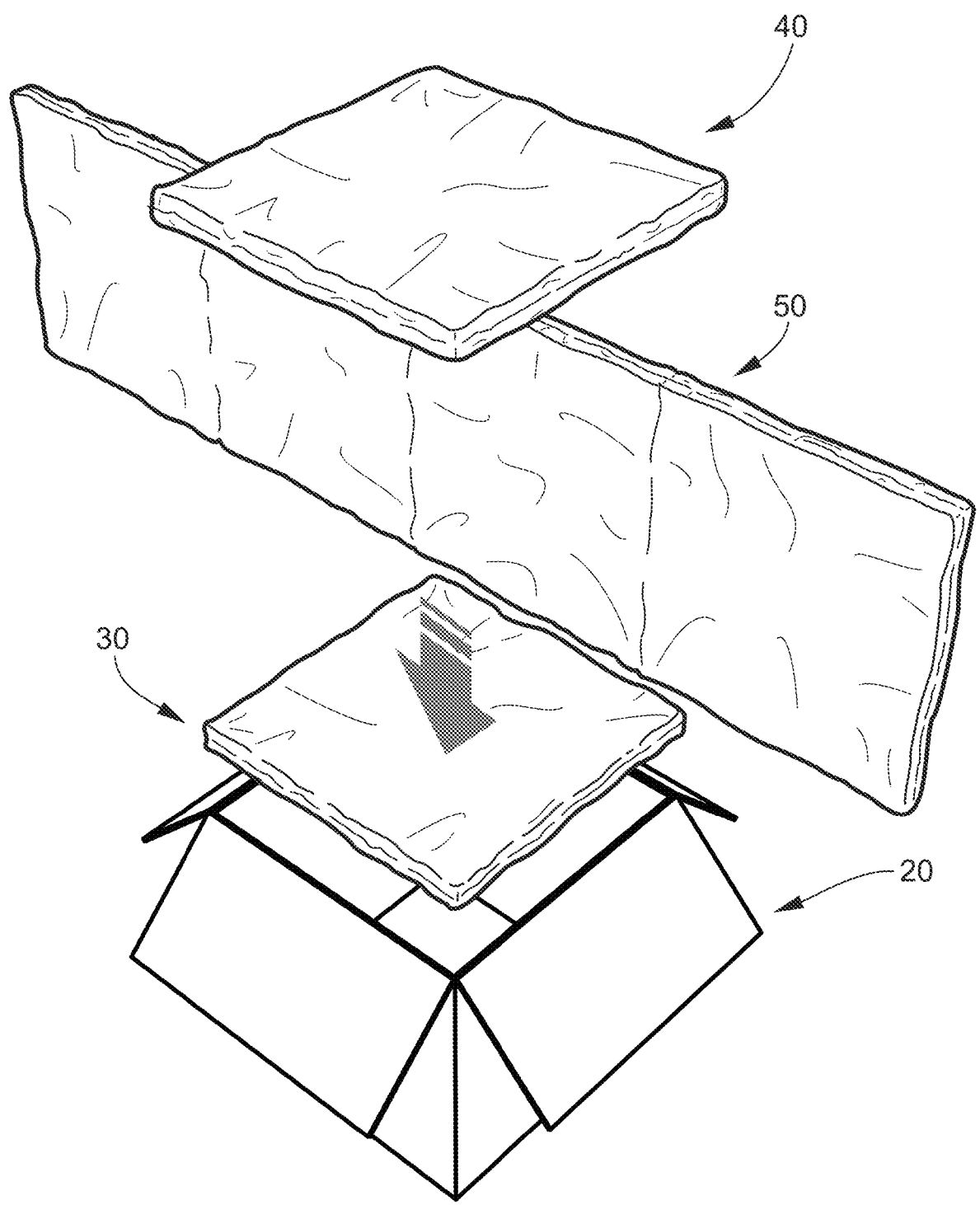
FIG. 2 is a perspective view of an embodiment of the invention in the unassembled state and showing the first pad being placed into the rigid container.
Figure 3:
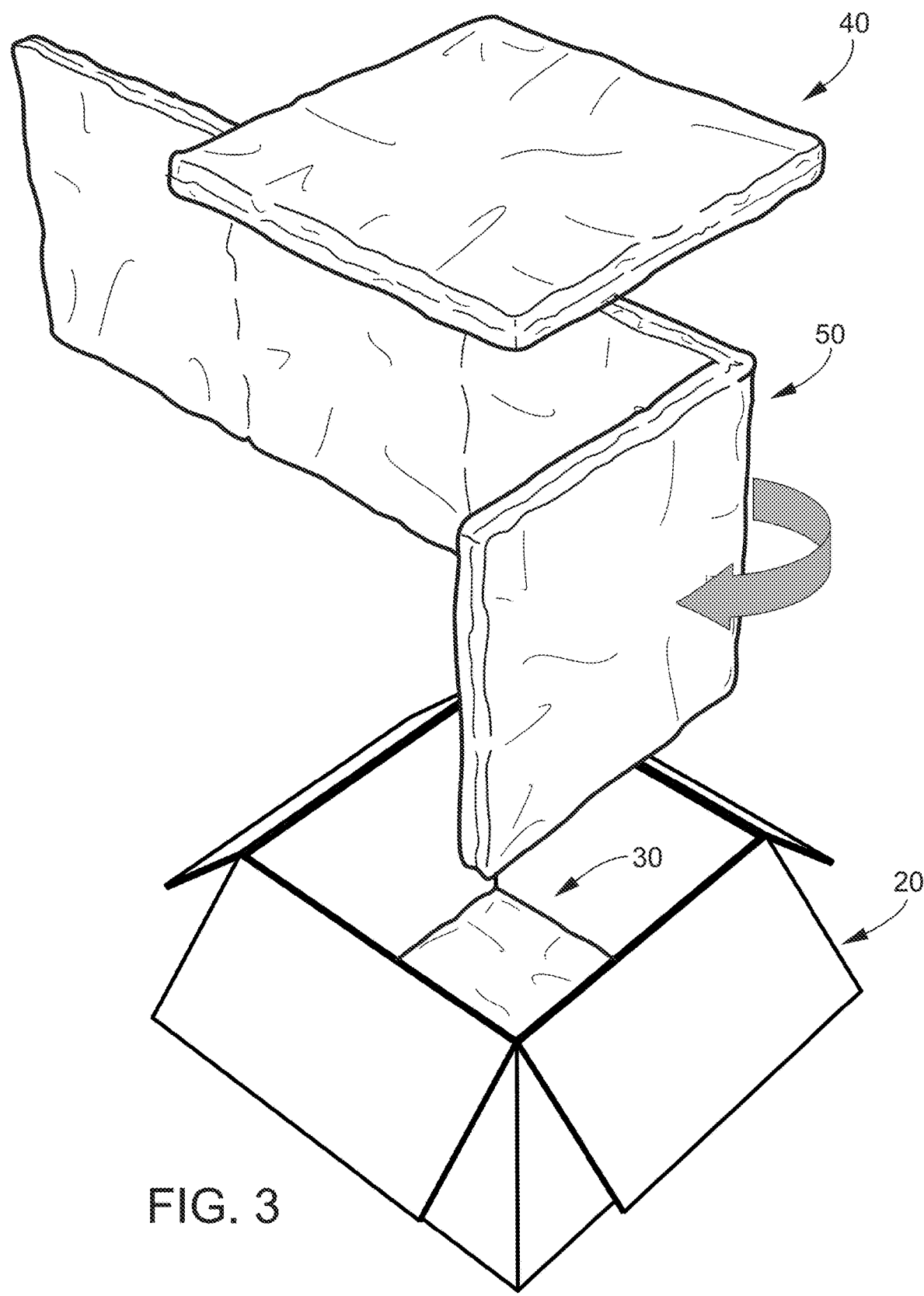
FIG. 3 is a perspective view of an embodiment of the invention in a partially assembled state and showing the partial folding of the third insulated pad.
Figure 4:
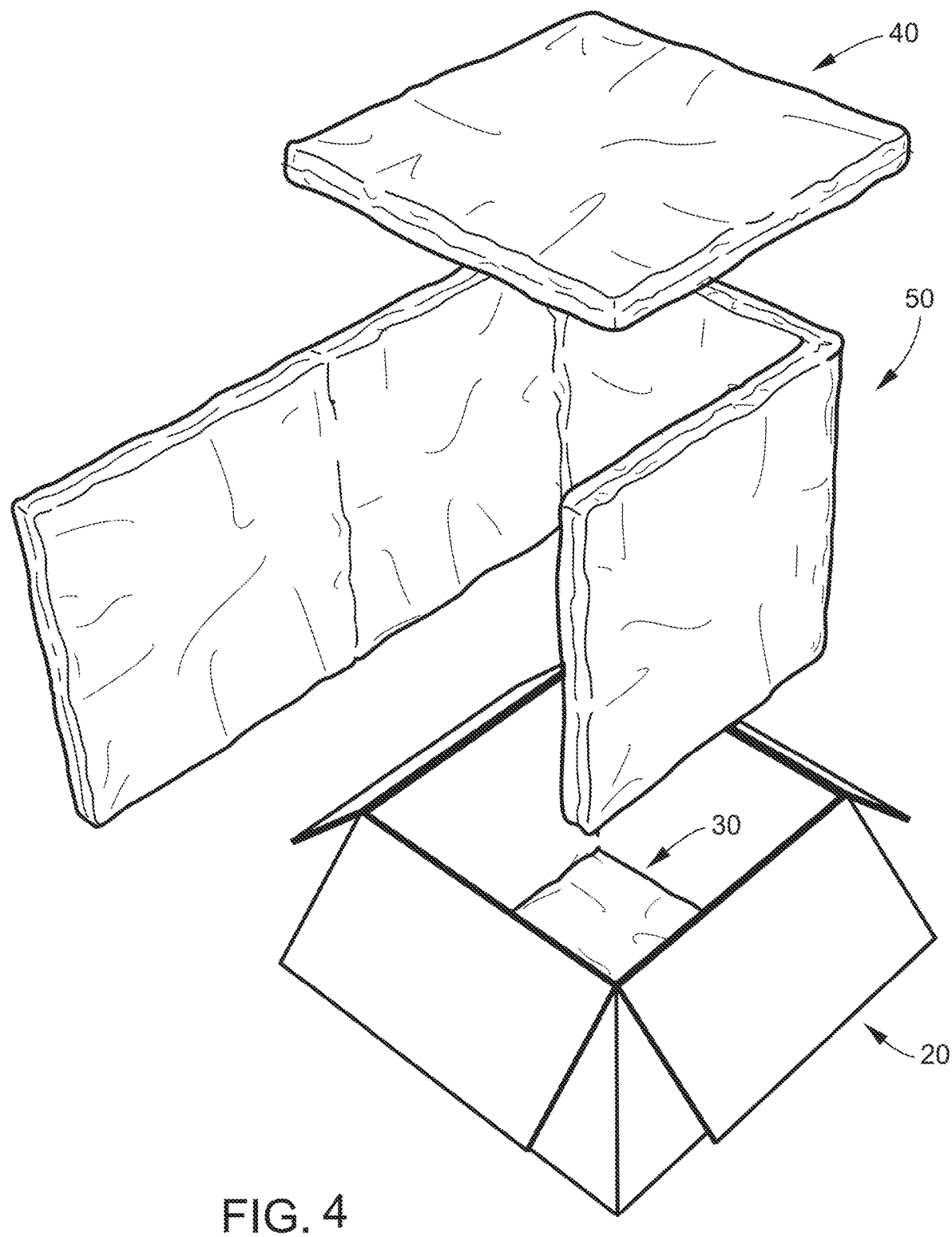
FIG. 4 is a perspective view of an embodiment of the invention in a partially assembled state and showing the partial folding of the third insulated pad.
Figure 5:
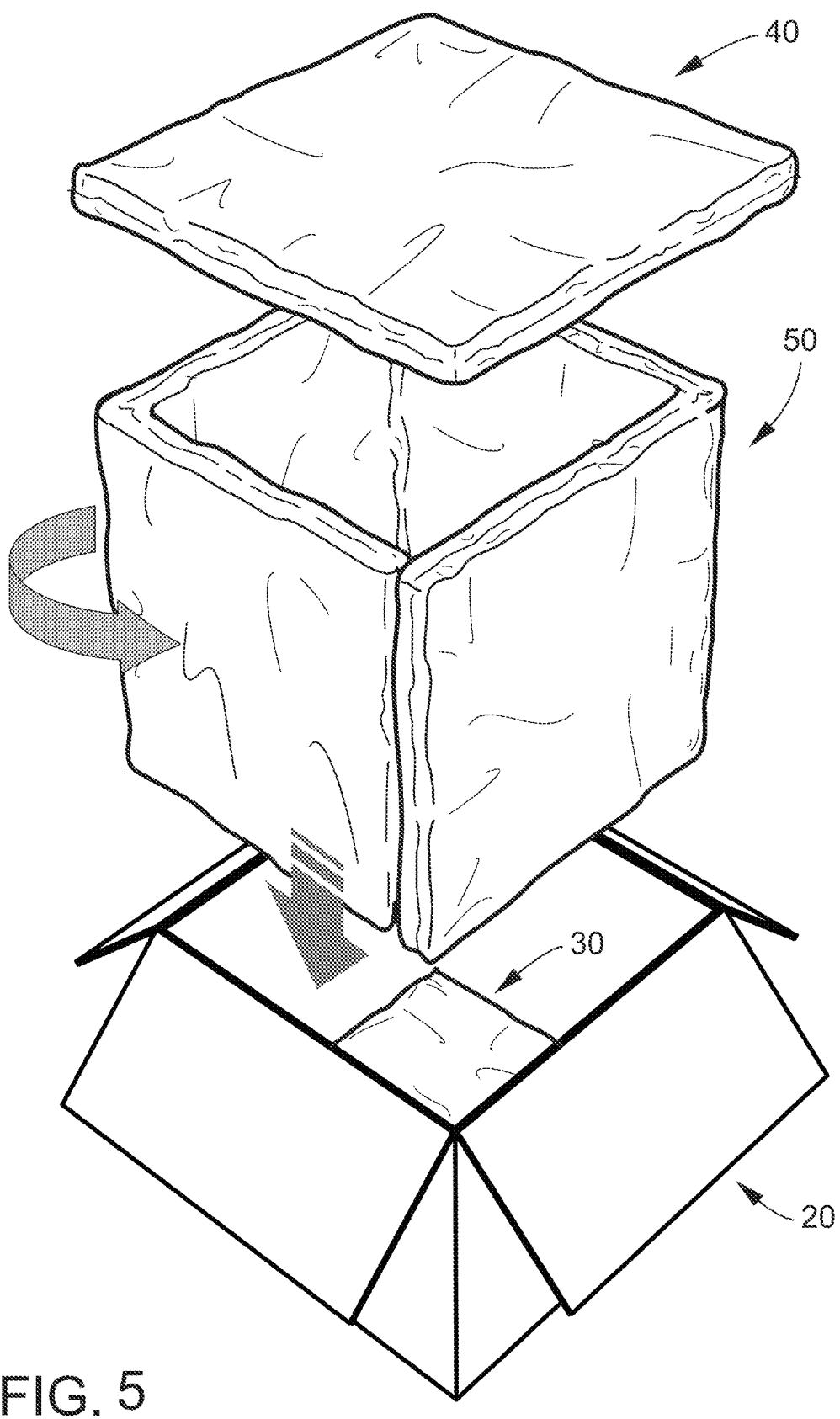
FIG. 5 is a perspective view of an embodiment of the invention in a partially assembled state and showing the complete folding of the third insulated pad.

Generally, FIG. 1 shows the insulated container 10 according to the present invention. Rigid container 20 may be made from a paper-based product such as cardboard or pasteboard and may generally form the shape of a box. The rigid container 20 may have a cuboid shape that may be a cube or a rectangular prism. As shown in FIG. 1, the rigid container 20 has a generally cube shape. FIG. 1 also shows the first insulated pad 30, the second insulated pad 40, and third insulated pad 50. As shown in FIG. 1, the unfaced 60 first, second, and third insulated pads are each encased in a poly-wrap 62. First insulated pad 30 has length 32, width 34, and thickness 36. Second insulated pad 40 has length 42, width 44, and thickness 46. Third insulated pad 50 has length 52, height/width 54 and thickness 56. The thickness of each of the first, second, and third insulated pads are the same in every embodiment. The length 32 of the first insulated pad 30 and the length 42 of the second insulated pad 40 are the same in every embodiment of the present invention. Similarly, the width 34 of the first insulated pad 30 and the width 44 of the second insulated pad 40 are the same in every embodiment. That is, the first and second insulated pads are identical in length, width, and thickness. The height/width 54 of the third insulated pad 50 will vary based on desired application. The length 52 of the third insulated pad 50 is shorter than the perimeter of the first insulated pad 30 where the perimeter is defined as the length 32 plus the width 34 multiplied by two.

Notably, the insulated container 10 according to the present invention consists of exactly three insulated pads, no more, no less, and the invention is characterized by exactly three pads. Insulated containers with more than three or less than three insulated pads are expressly excluded by the present invention. The present limitation directed to an insulated container consisting of three and only three insulated pads is an unexpected result of previous designs focused on using two or fewer insulated pads. For example, U.S. Pat. No. 10,246,236 discloses a pair of interlocking C shaped insulation pads. By way of a further example, WO 2019/125511 discloses a single insulation pad. The present invention has produced unexpected results in that the three insulation pads are actually less expensive to manufacture than two insulation pads or one insulation pad. This reduction in manufacturing costs is attributable to an aspect of the invention whereby a continuous sheet produced from an airlay machine can utilize a single cut with a knife at various lengths of material as the material exits the machine. There is also an unexpected result in assembly and packing. During packing according to the prior art, both the prior art interlocking C shaped insulated pads and the single T shaped insulated pad required an assembler to lift the top flap in order to place the payload in the insulated container. However, the present invention has achieved an unexpected result in that, during packing, the insulated container remains freely open until after the contents have been added to the insulated container, with the final step that the second insulated pad is added to the top. This aspect is especially important where medical contents are added and photographed in the container prior to closure. From a shipping perspective, efficiencies are also achieved since the manufacturer can ship rigid containers with the first and third insulated pads already positioned in the rigid container and a large quantity of second insulated pads in a separate container, which separate container can be positioned at the end of an assembly line. Prior art processes required the packaging manufacturer to ship pads, including different size pads, separately from the rigid container which were then added to the rigid container during assembly and packaging—adding to the cost of manufacturing. In short, it is an unexpected result that increasing the number of insulated pads would decrease cost to manufacture, transport, assemble, and pack the insulated container and increase efficiencies across the spectrum.

The insulated pads 20, 30, 40 of the present invention are made pre-consumer post-industrial cotton or synthetic waste and are made using an airlay machine (not shown). One of skill in the art will recognize that airlay is a process that has been used for some time in which bulk cotton or synthetic fiber is fed into the machine and airlaid non-woven cotton and synthetic product exits. The airlay machine produces a continuous sheet of non-woven cotton or synthetic fiber which is then cut by a knife or die-cut press into a desired shape or profile. According to an embodiment of the present invention, a knife or die-cut press (not shown) cuts the continuous sheet into square or rectangular shapes forming the insulated pads.

FIGS. 2 through 8 demonstrate how the insulated container 10 of the present invention is assembled using the rigid container 20, the first insulated pad 30, the second insulated pad 40, and the third insulated pad 50. First, the first insulated pad 30 is placed in the bottom of the rigid container 20. Next, the third insulated pad 50 is placed in the rigid container 20 and folded along three parallel lines 58 which align with corners of the rigid container 20. The sides of the third insulated pad 50 will be in contact with the sides of the rigid container 20.

Figure 6:
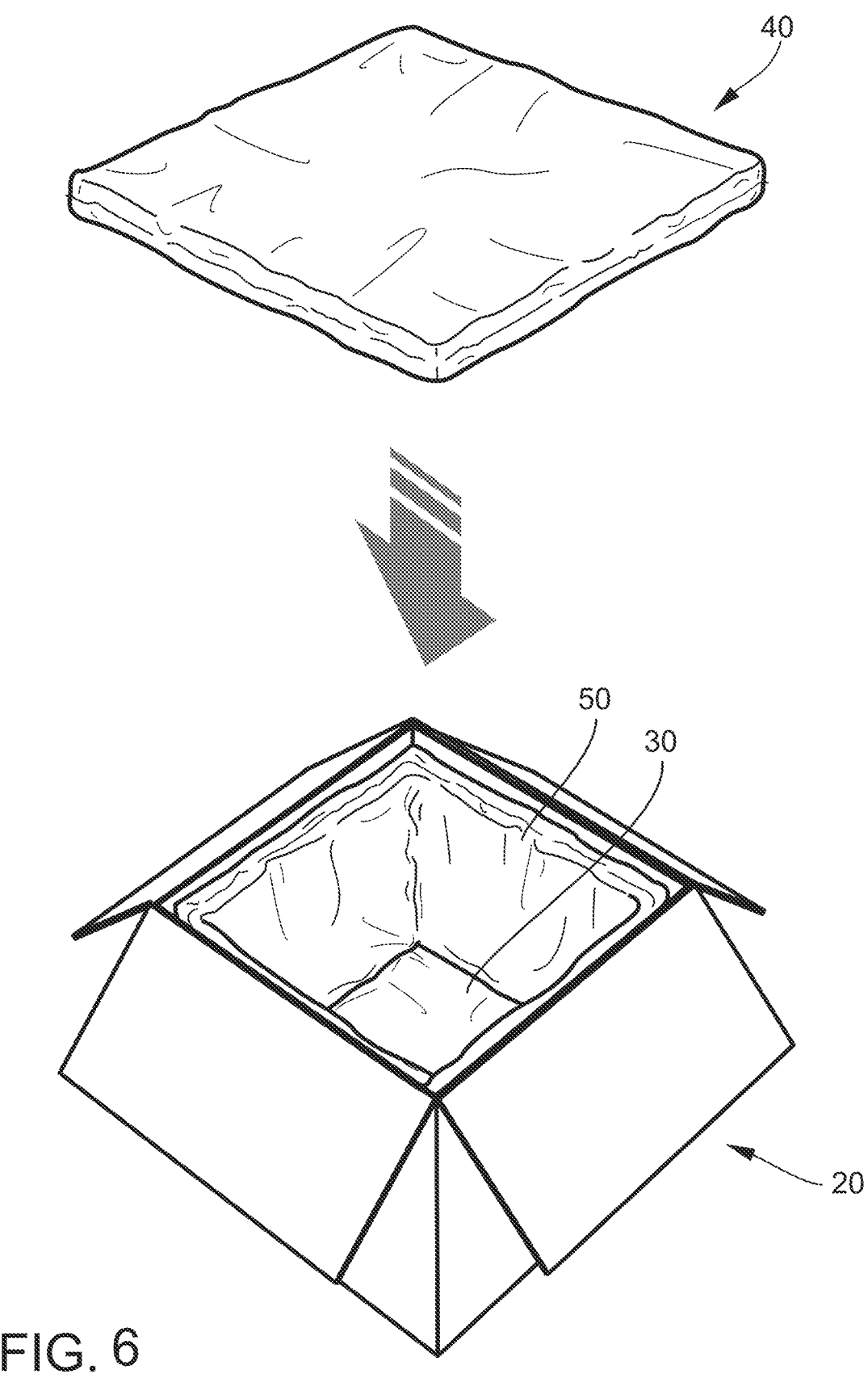
FIG. 6 is a perspective view of an embodiment of the invention in a partially assembled state and showing the second insulated pad being prepared for positioning on top of the third insulated pad.
Figure 7:
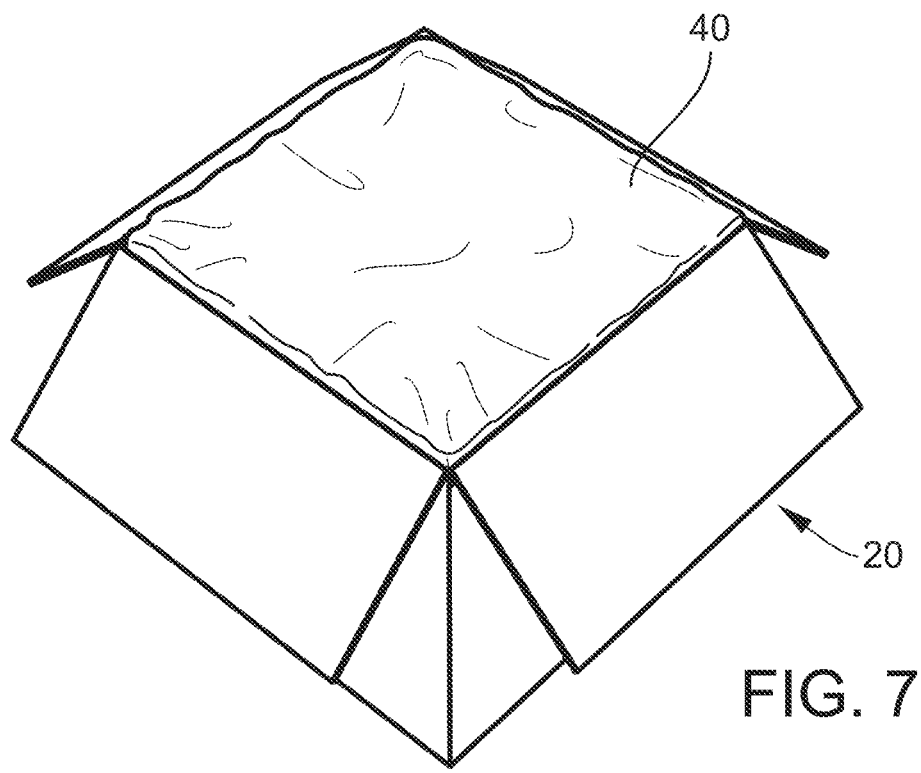
FIG. 7 is a perspective view of an embodiment of the invention in a partially assembled state and showing the second insulated pad installed and the top of the rigid container open.
Figure 8:
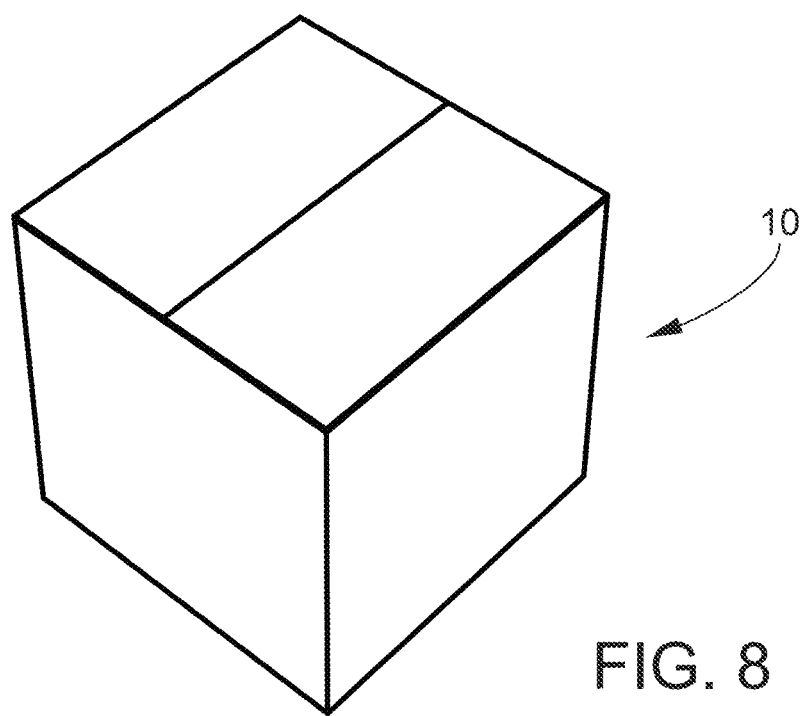
FIG. 8 is a perspective view of an embodiment of the invention in a fully assembled state and showing the top of the rigid container closed.

At this point, as specifically shown in FIG. 6, the insulated container 20 may be shipped from its manufacturing facility to a packaging destination where one or more objects (not shown), such medicine or food, are placed in the container along with appropriate cooling packs such as ice, dry ice, or other cooling packs. In such a scenario, the second insulation pad 40 is provided to the packaging destination at the same time as the remainder of the insulation container 10 so that the final steps may be accomplished. That is, after the objects are placed in the container, the second insulated pad 40 is placed inside the rigid container 10 atop the third insulated pad 50 and the top or lid of the rigid container 20 is closed. Notably, the third insulated pad 50 provides support to the second insulated pad 40 as shown in FIG. 7.

Figure 9:
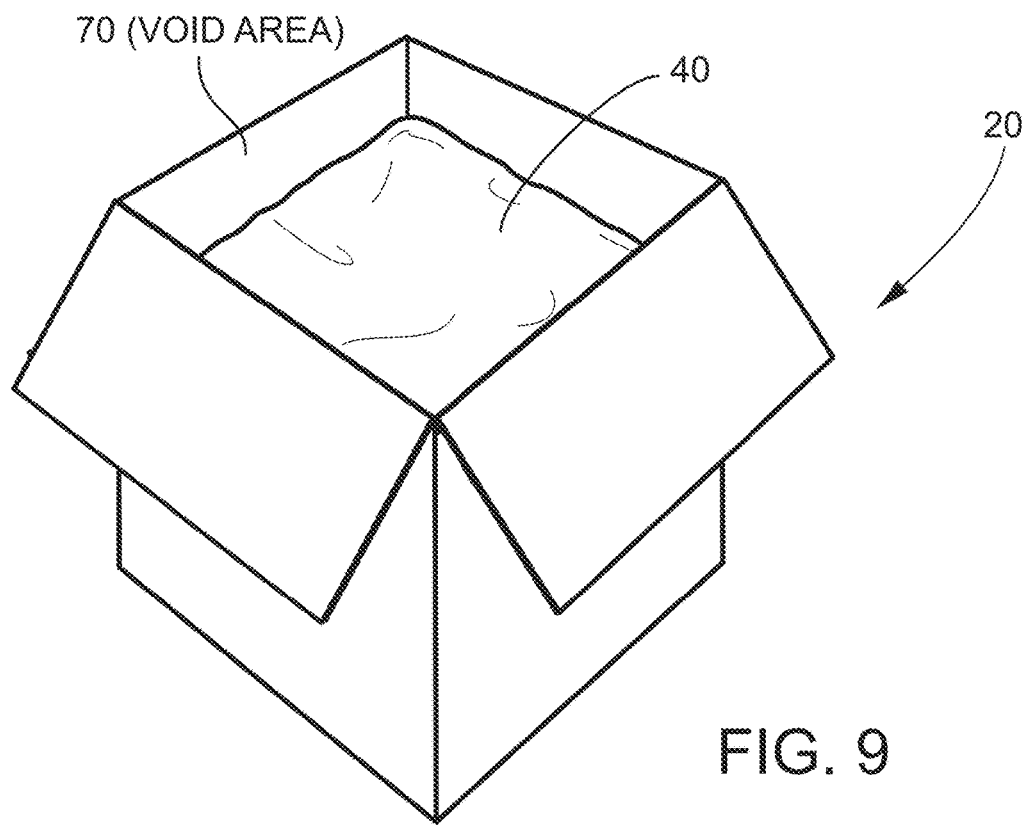
FIG. 9 is a perspective view of an embodiment of the invention in the partially assembled state with the top of the rigid container open and showing the uninsulated void above the second pad.
Figure 10:
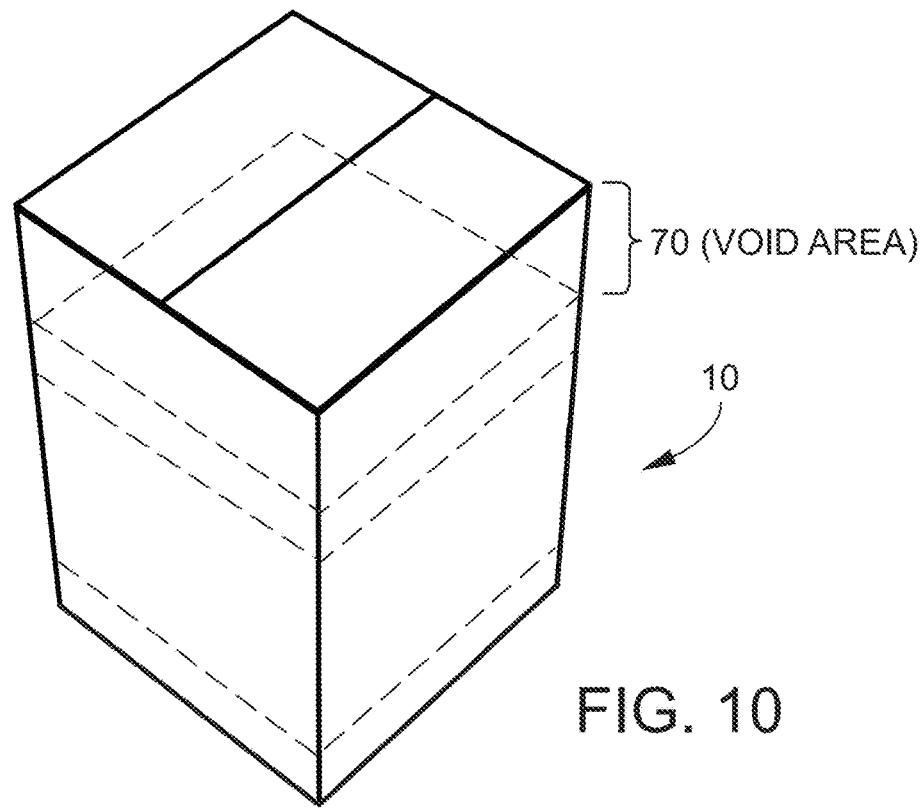
FIG. 10 is a perspective view of an embodiment of the invention in the fully assembled state with the top of the rigid container closed and showing the assembled first, second, and third insulated pads within the rigid container and the uninsulated void above the second insulated pad.
Figure 11:
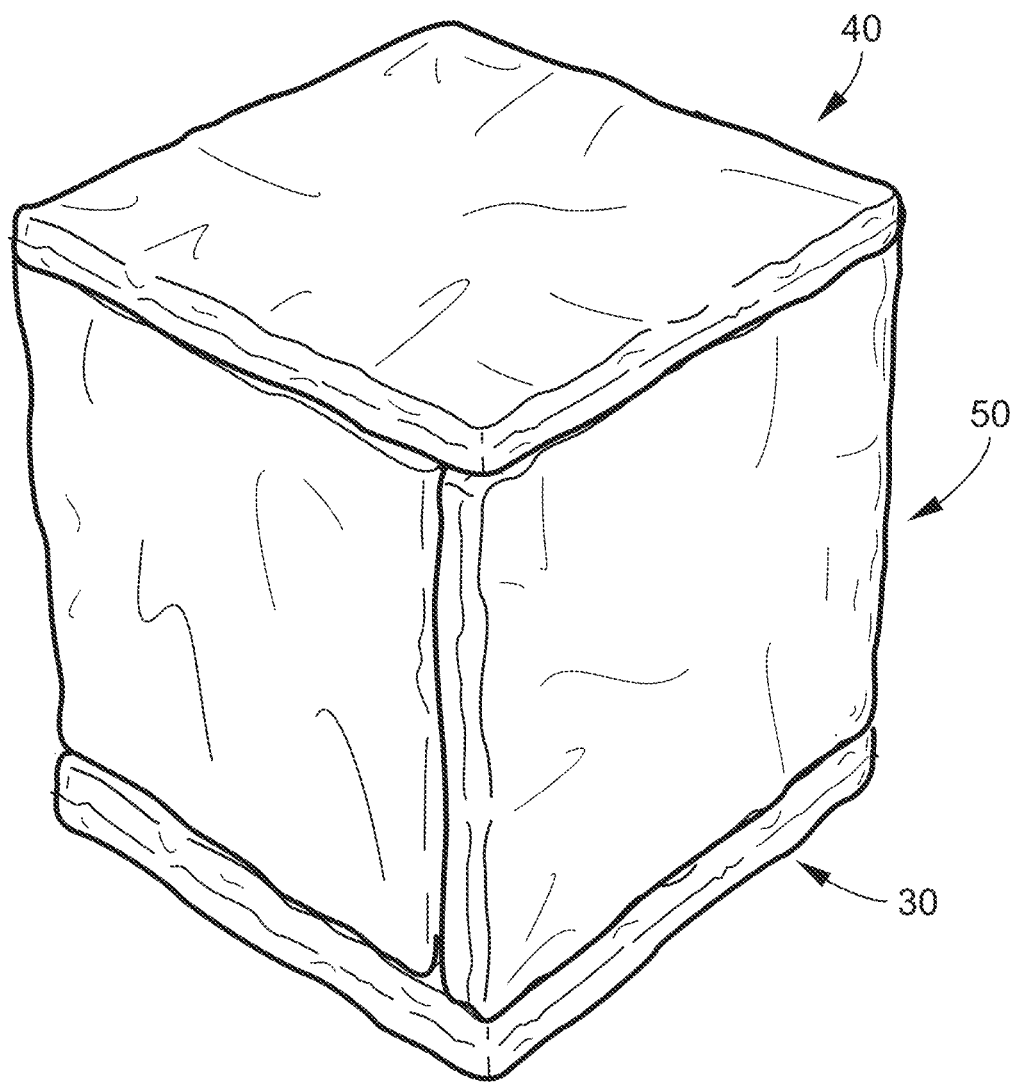
FIG. 11 is a perspective view of the assembled insulated pads encased in poly-wrap.
Figure 12:
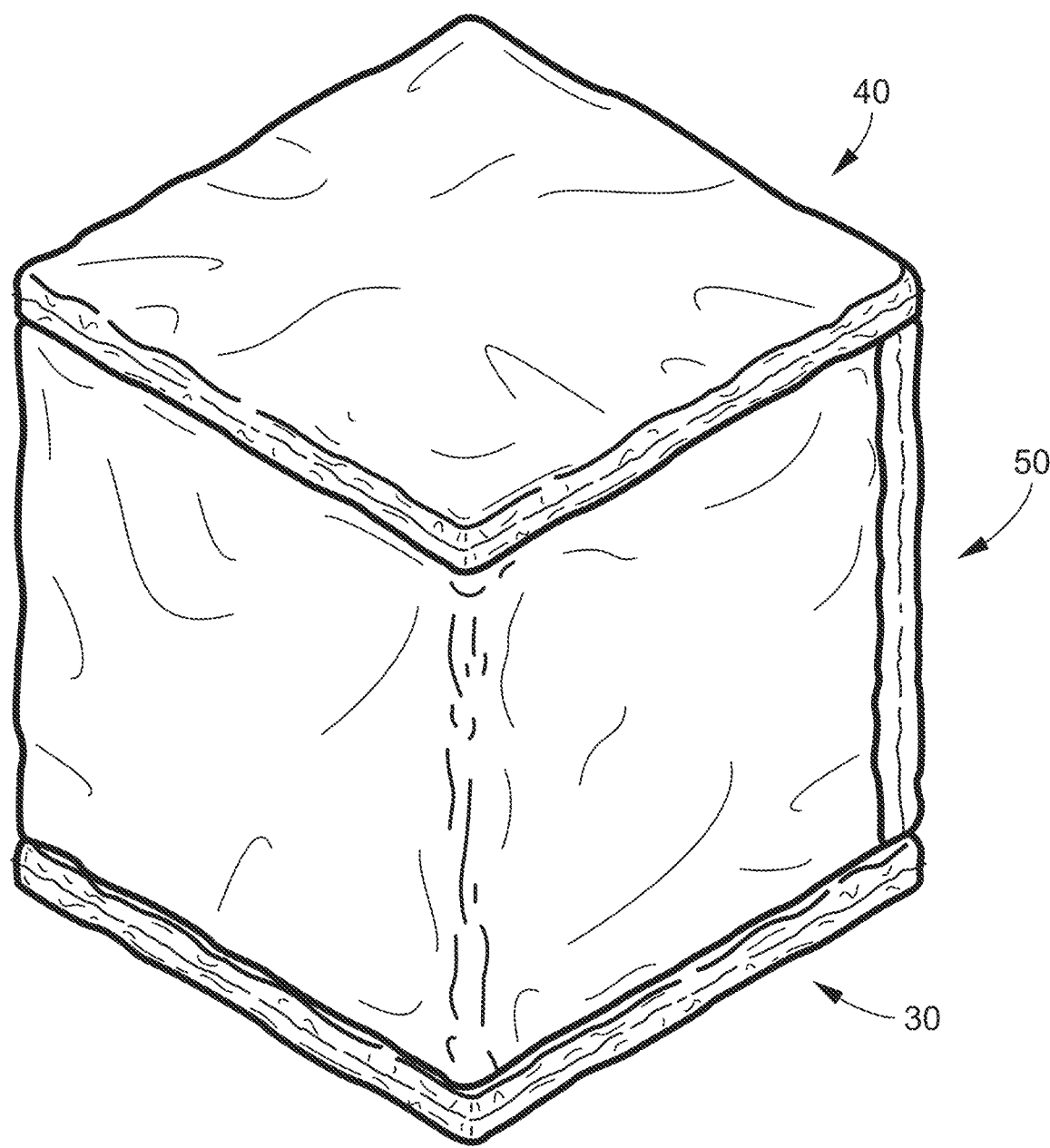
FIG. 12 is a perspective view of the assembled insulated pads encased in poly-wrap.
Figure 13:
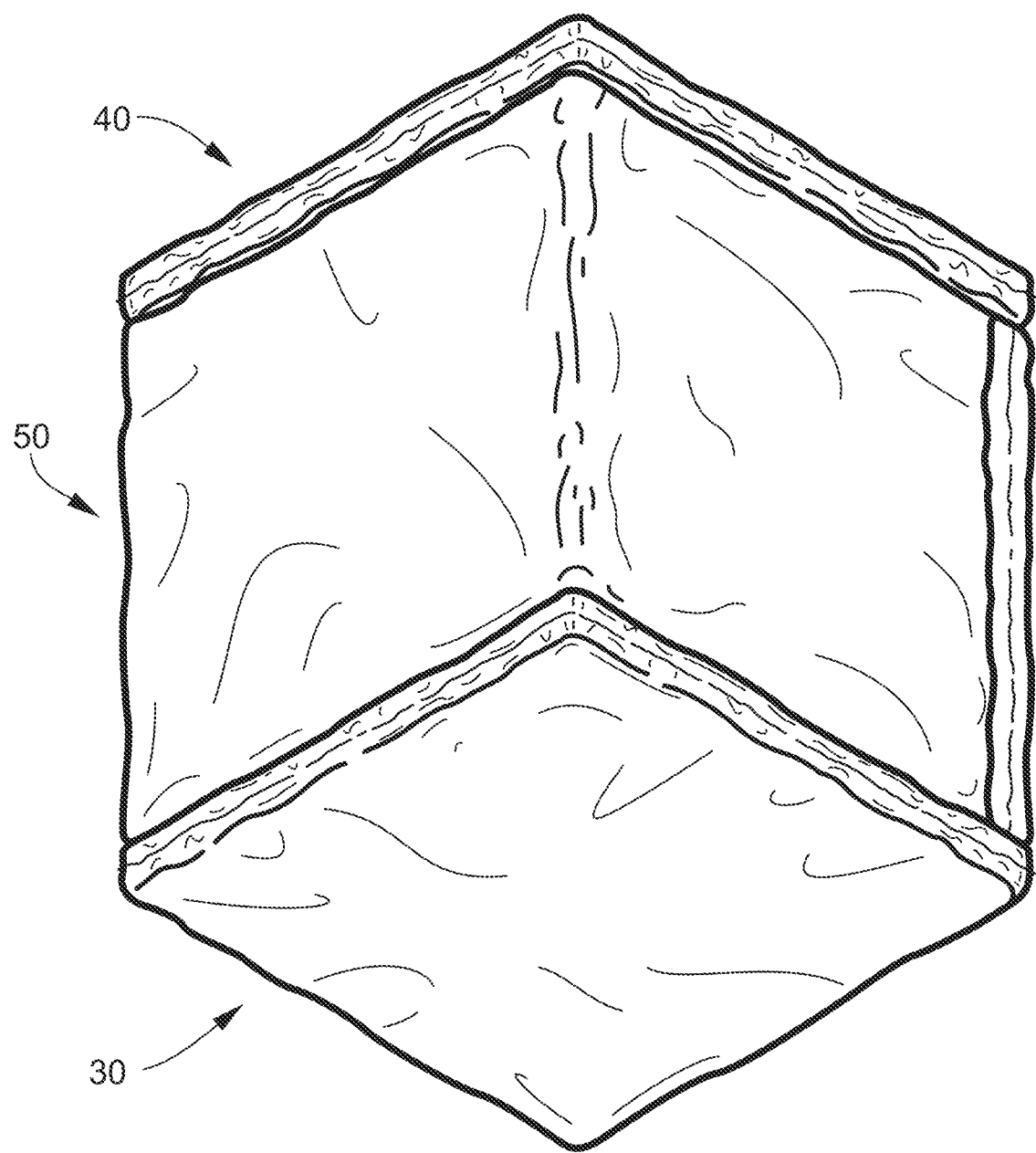
FIG. 13 is a perspective view of the assembled insulated pads encased in poly-wrap.
Figure 14:
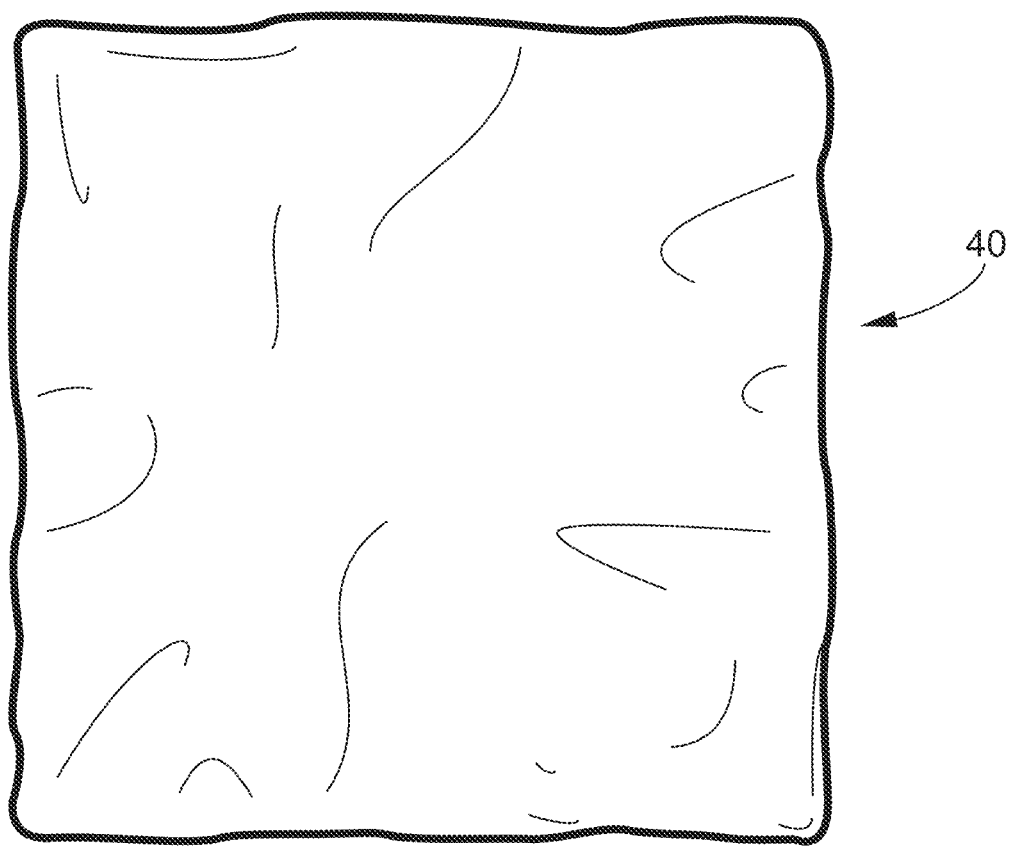
FIG. 14 is a top view of the assembled insulated pads encased in poly-wrap.
Figure 15:
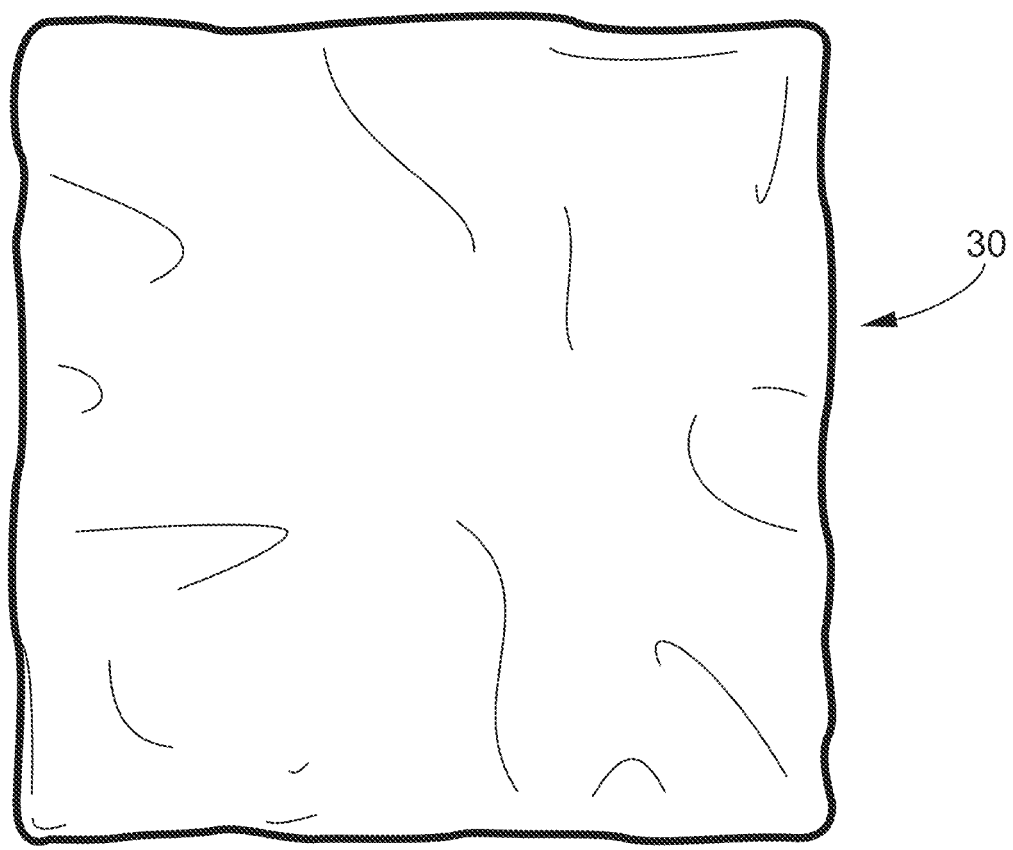
FIG. 15 is a bottom view of the assembled insulated pads encased in poly-wrap.
Figure 16:
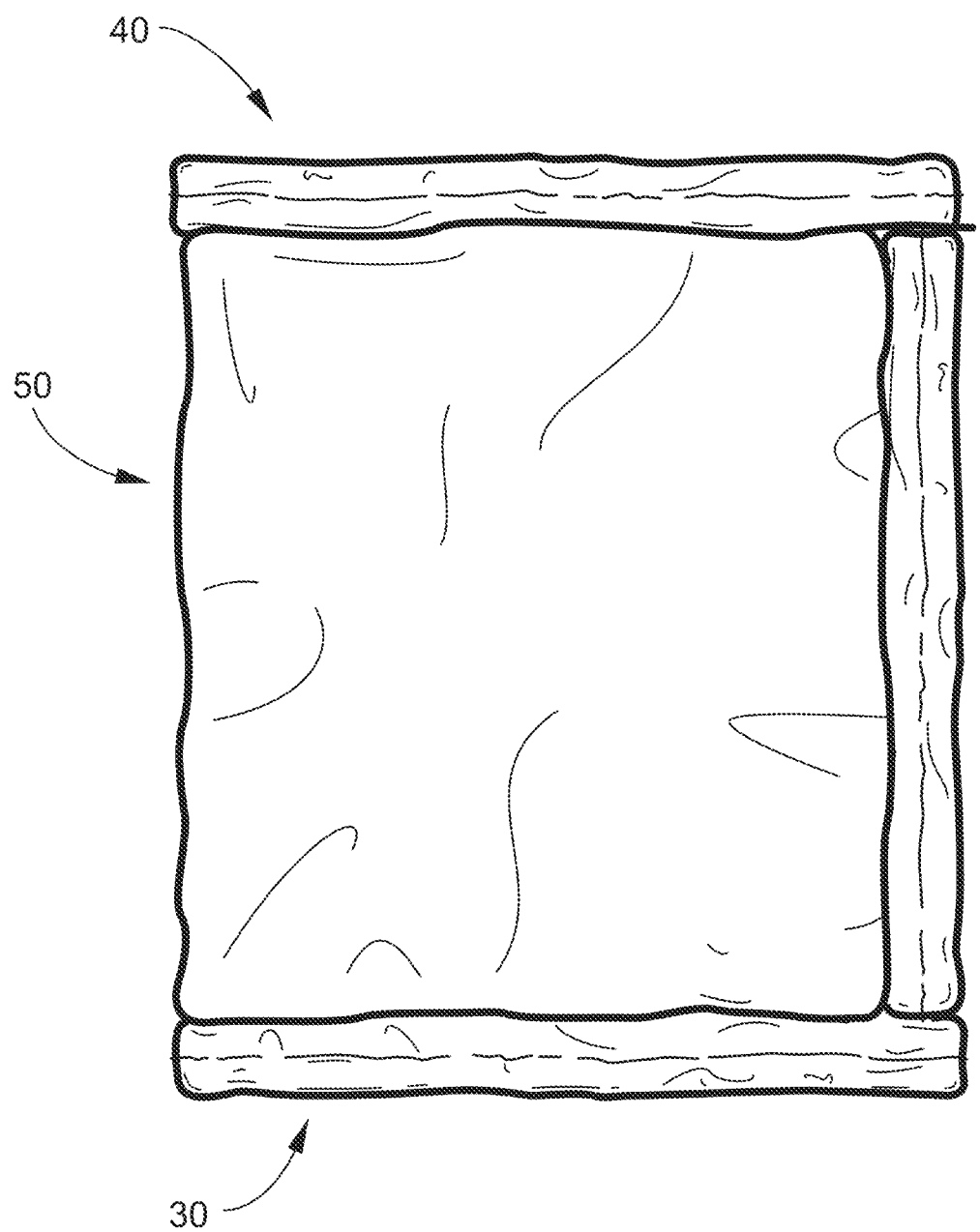
FIG. 16 is a front view of the assembled insulated pads encased in poly-wrap.
Figure 17:
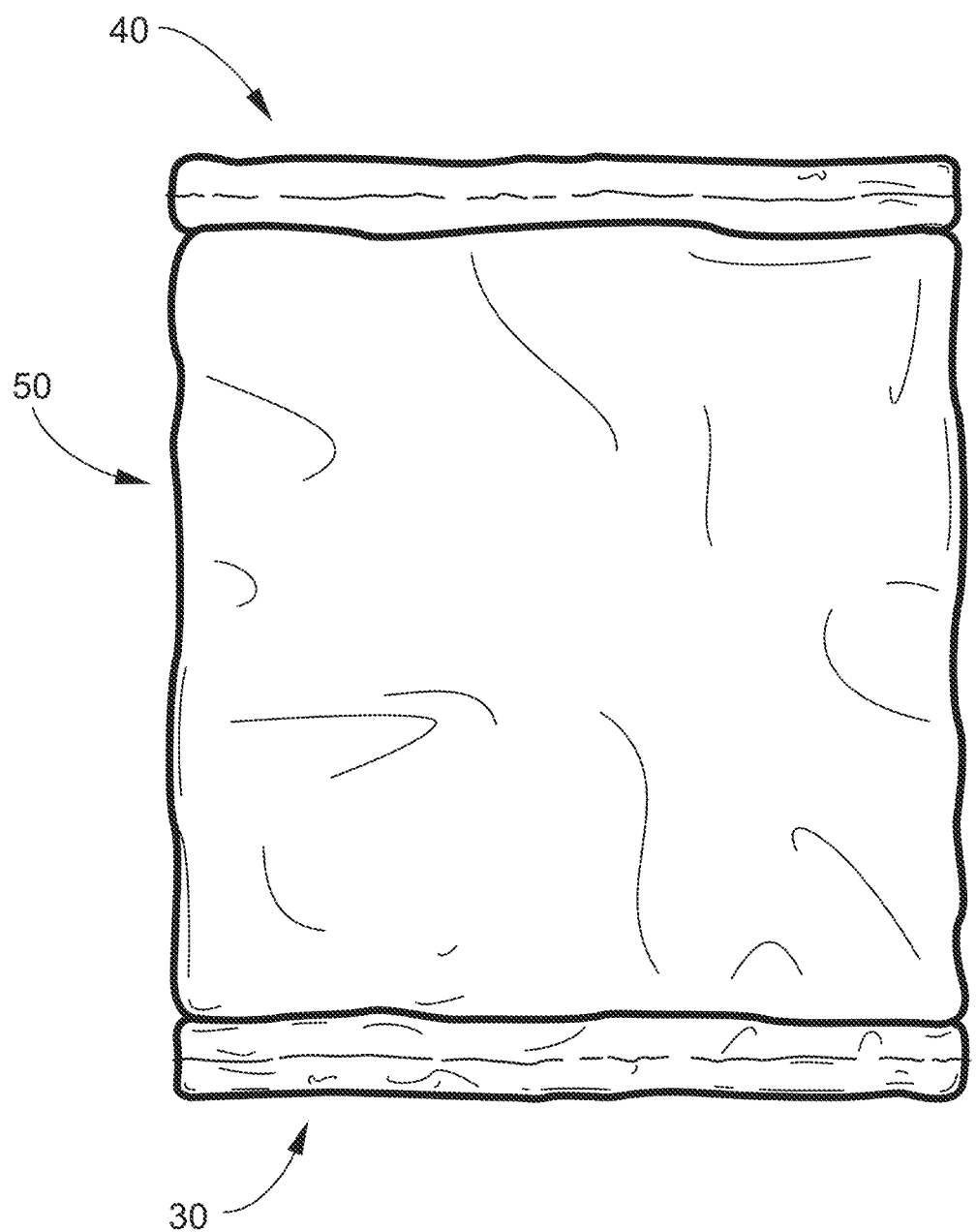
FIG. 17 is a left side view of the assembled insulated pads encased in poly-wrap.
Figure 18:
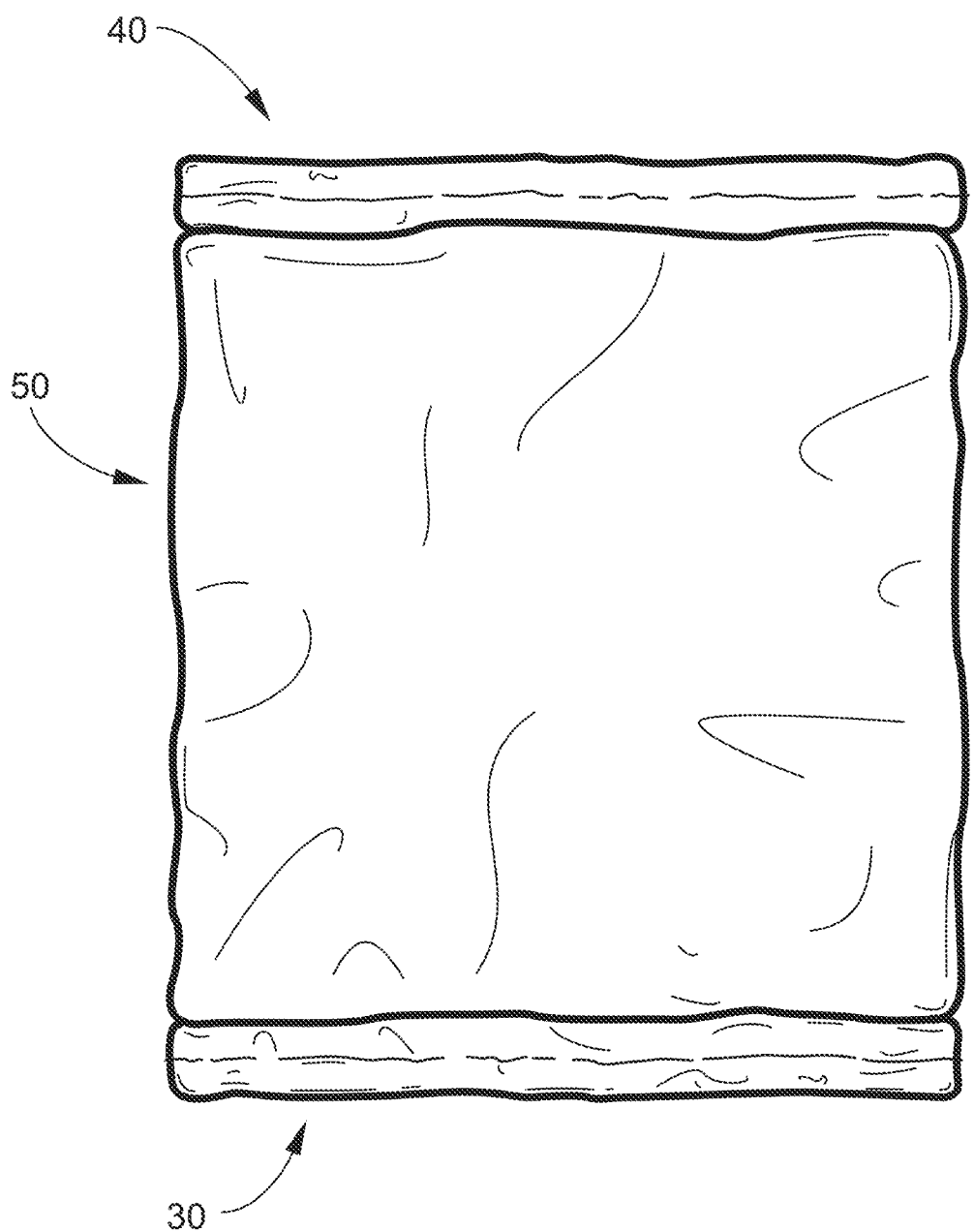
FIG. 18 is a rear side view of the assembled insulated pads encased in poly-wrap.
Figure 19:
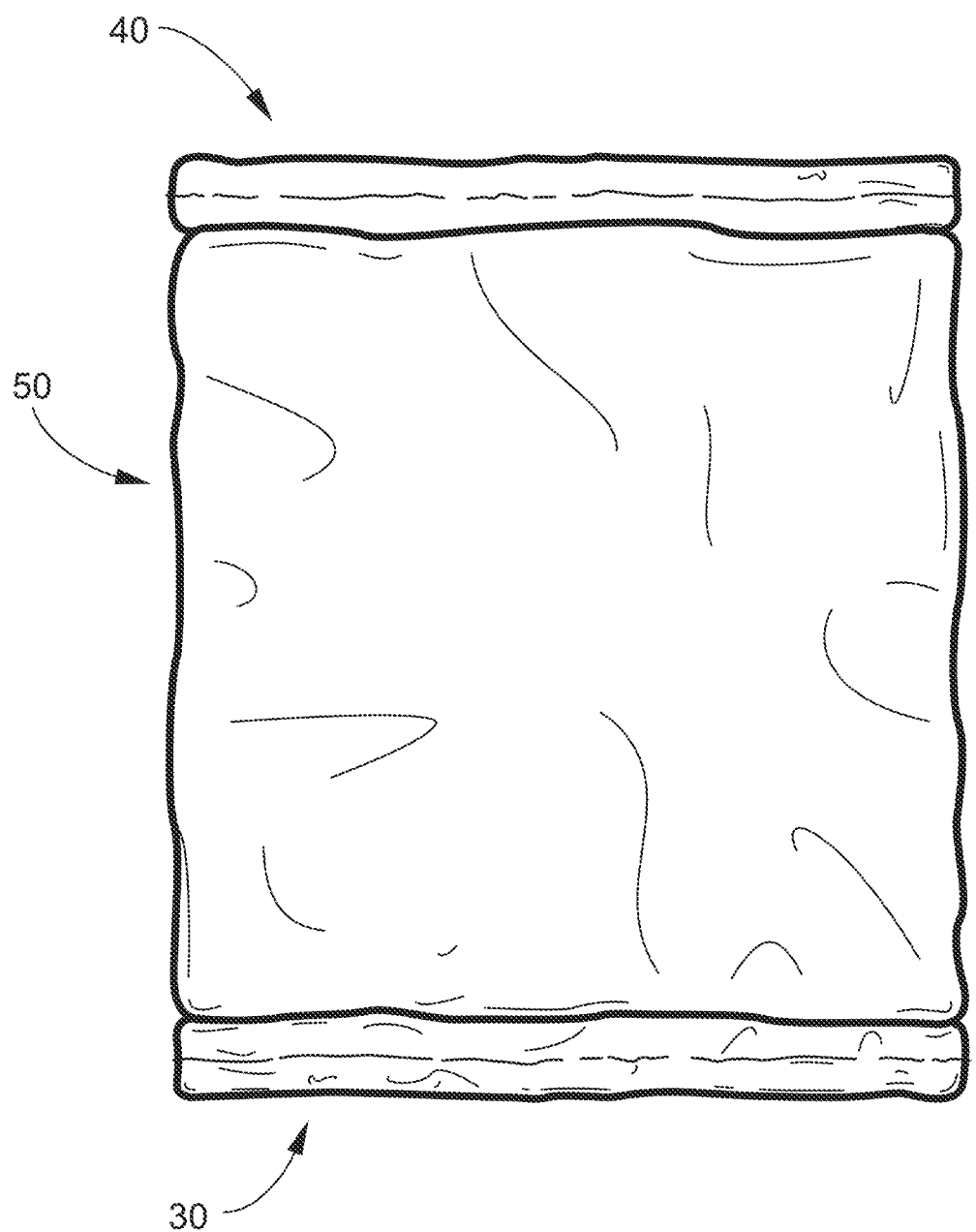
FIG. 19 is a right side view of the assembled insulated pads encased in poly-wrap.
Figure 20:
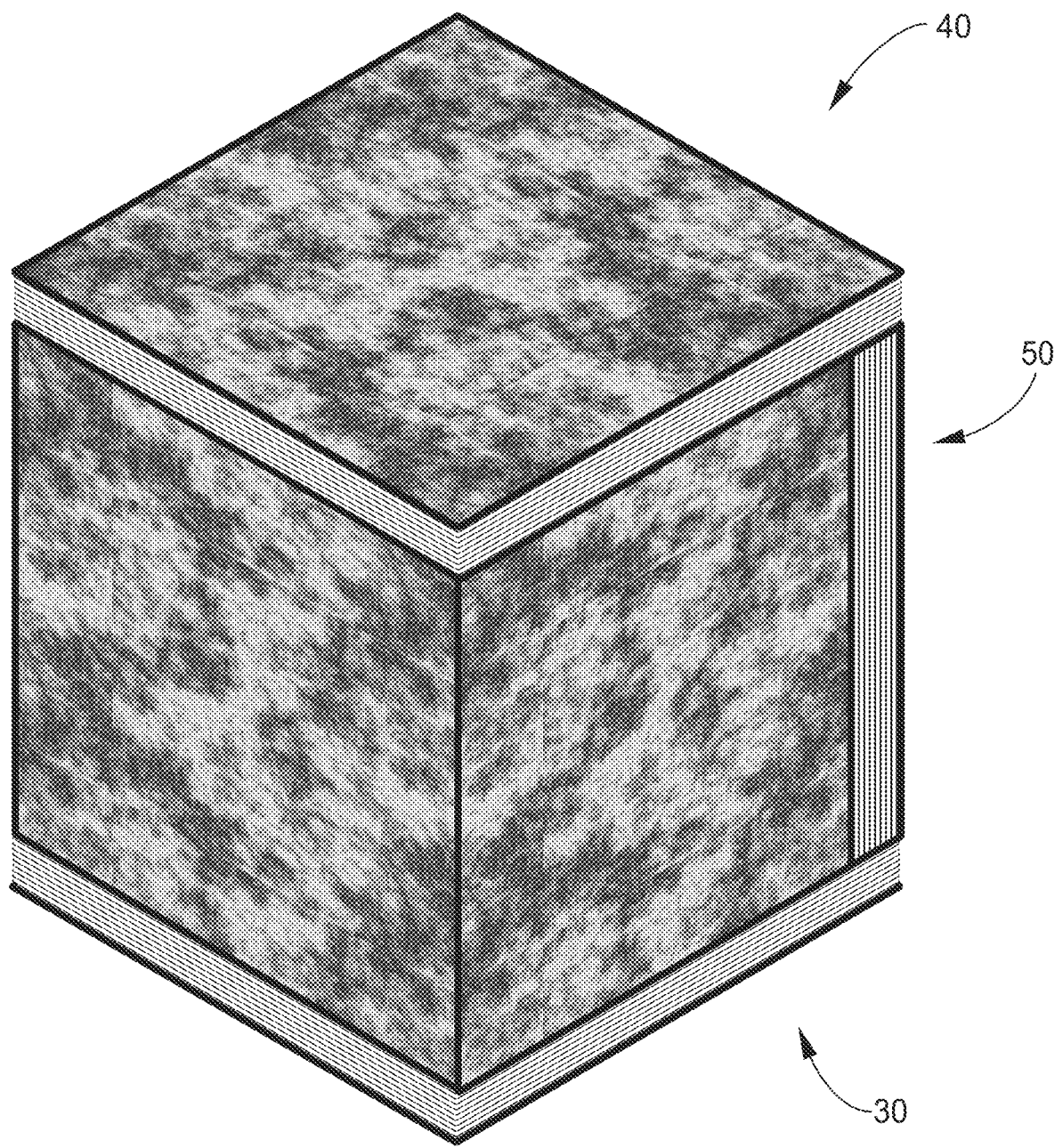
FIG. 20 is a perspective view of the assembled unfaced insulated pads.
Figure 21:
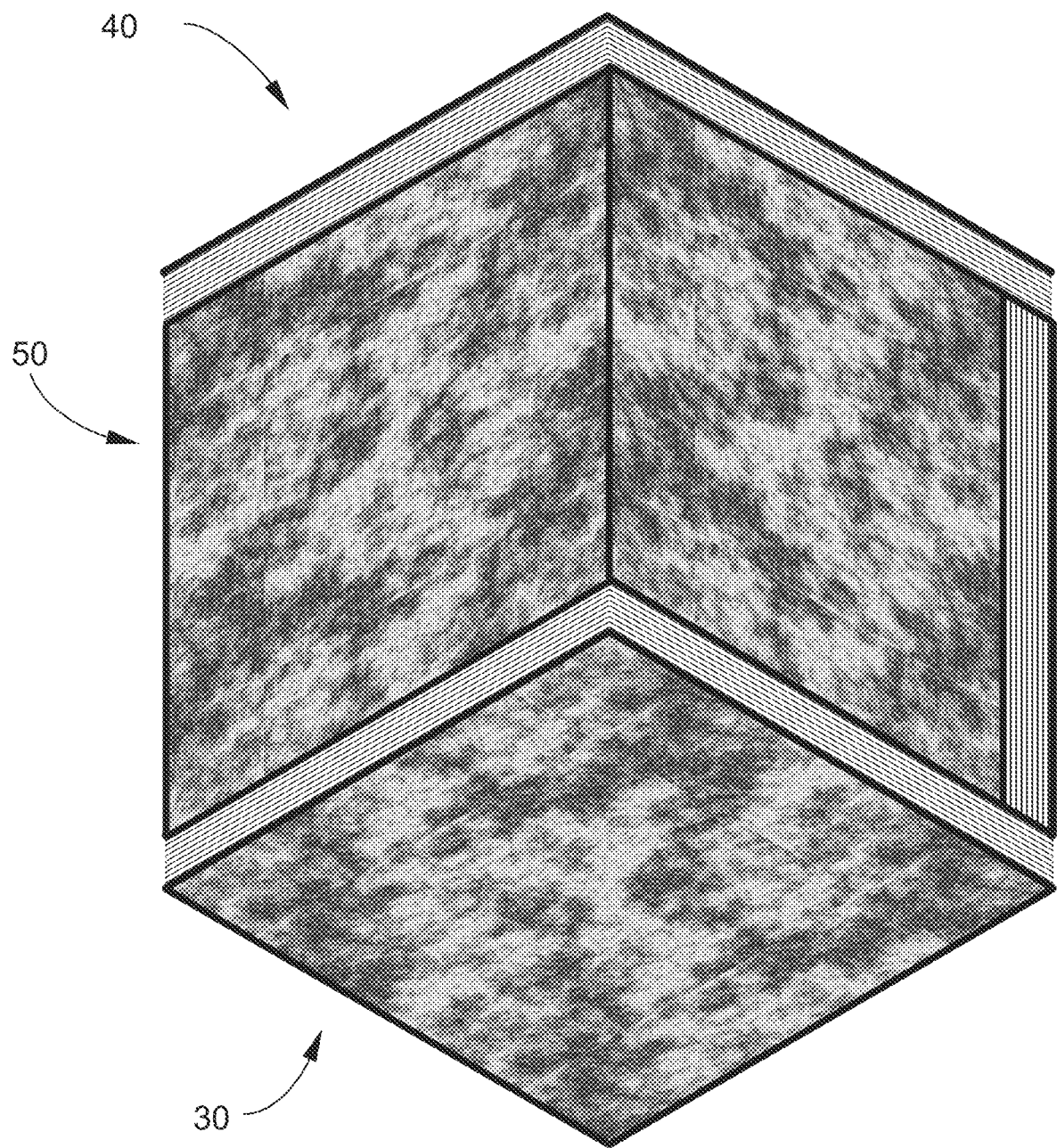
FIG. 21 is a perspective view of the assembled unfaced insulated pads.
Figure 22:
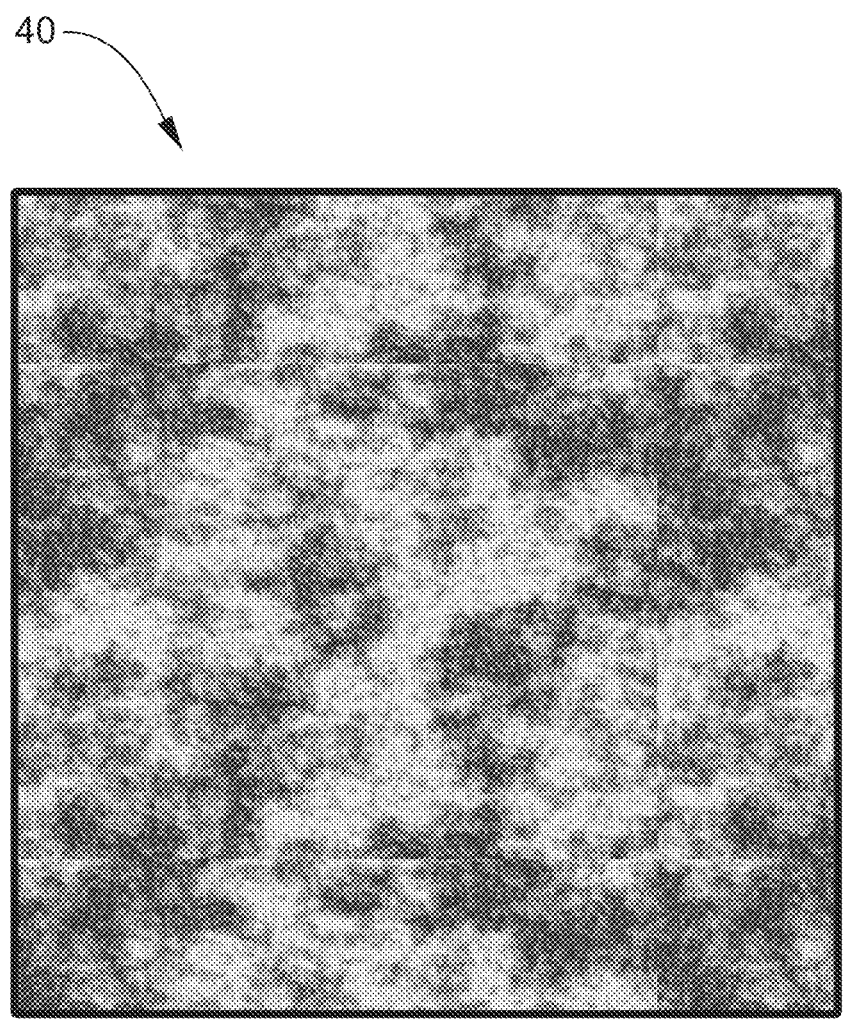
FIG. 22 is a top view of the assembled unfaced insulated pads.
Figure 23:
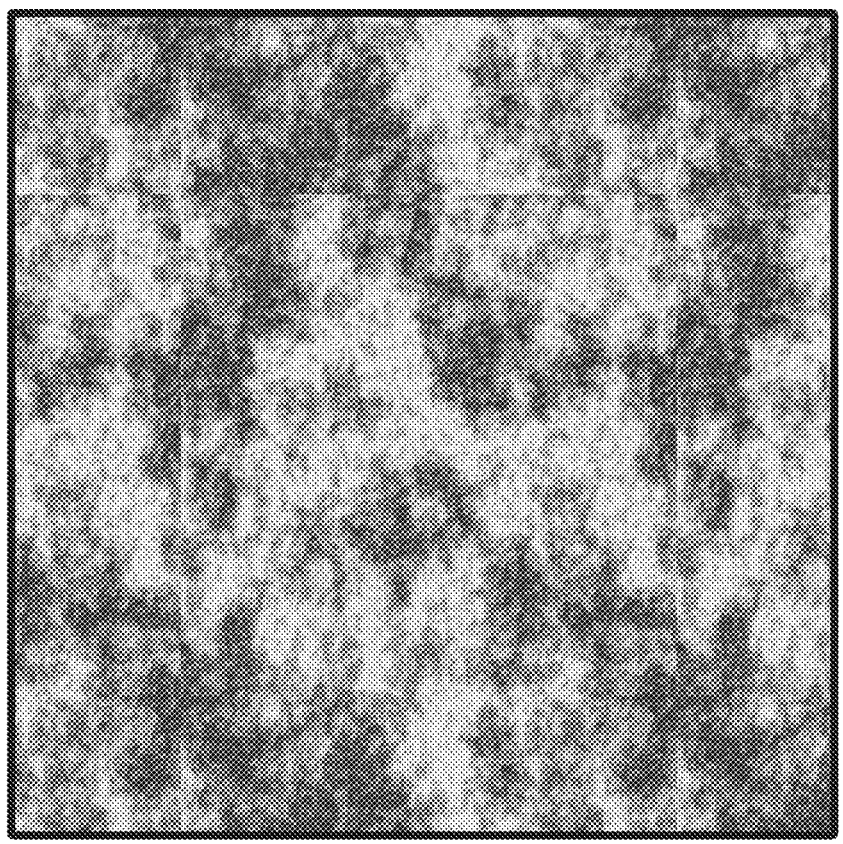
FIG. 23 is a bottom view of the assembled unfaced insulated pads.
Figure 24:
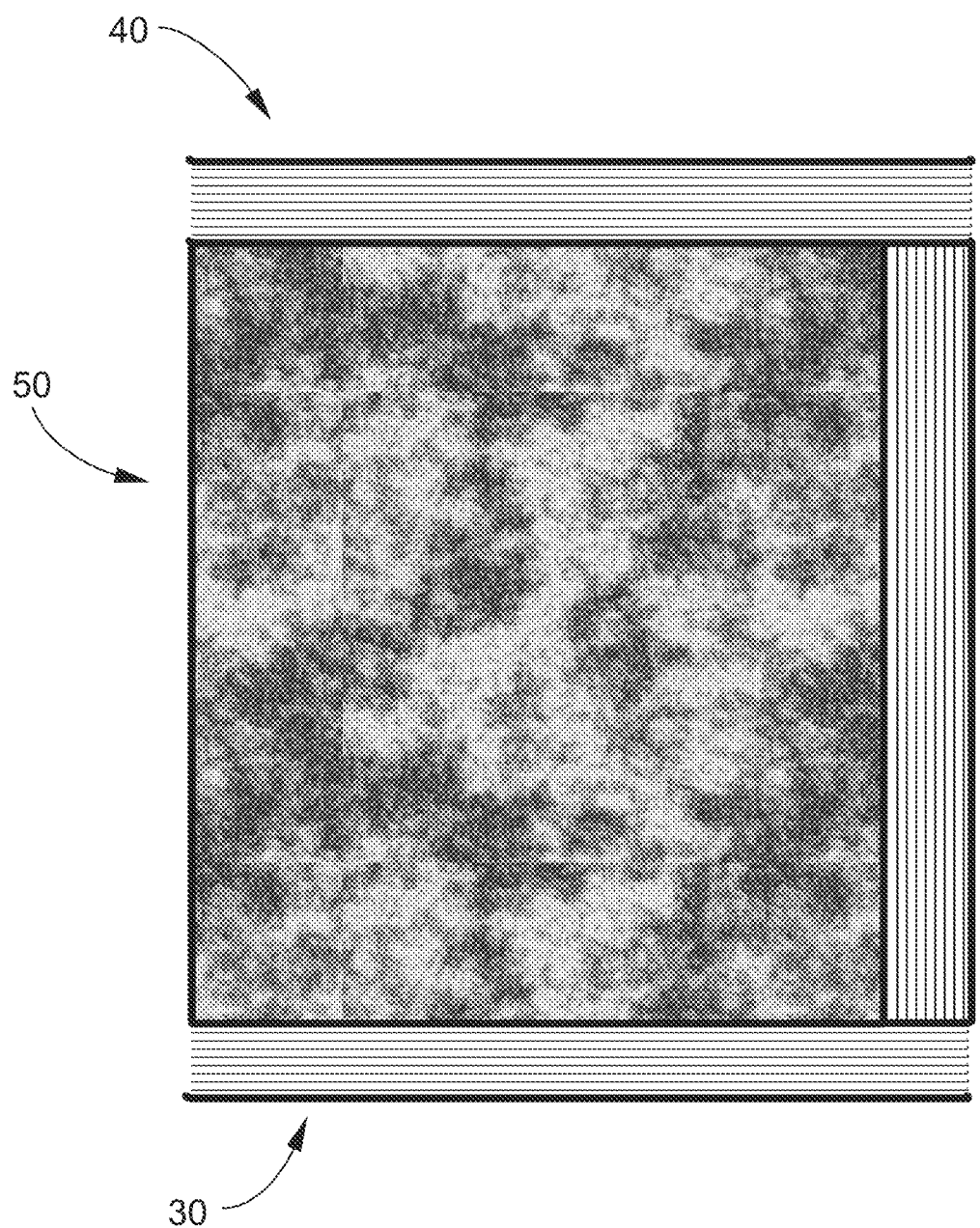
FIG. 24 is a front view of the assembled unfaced insulated pads.
Figure 25:
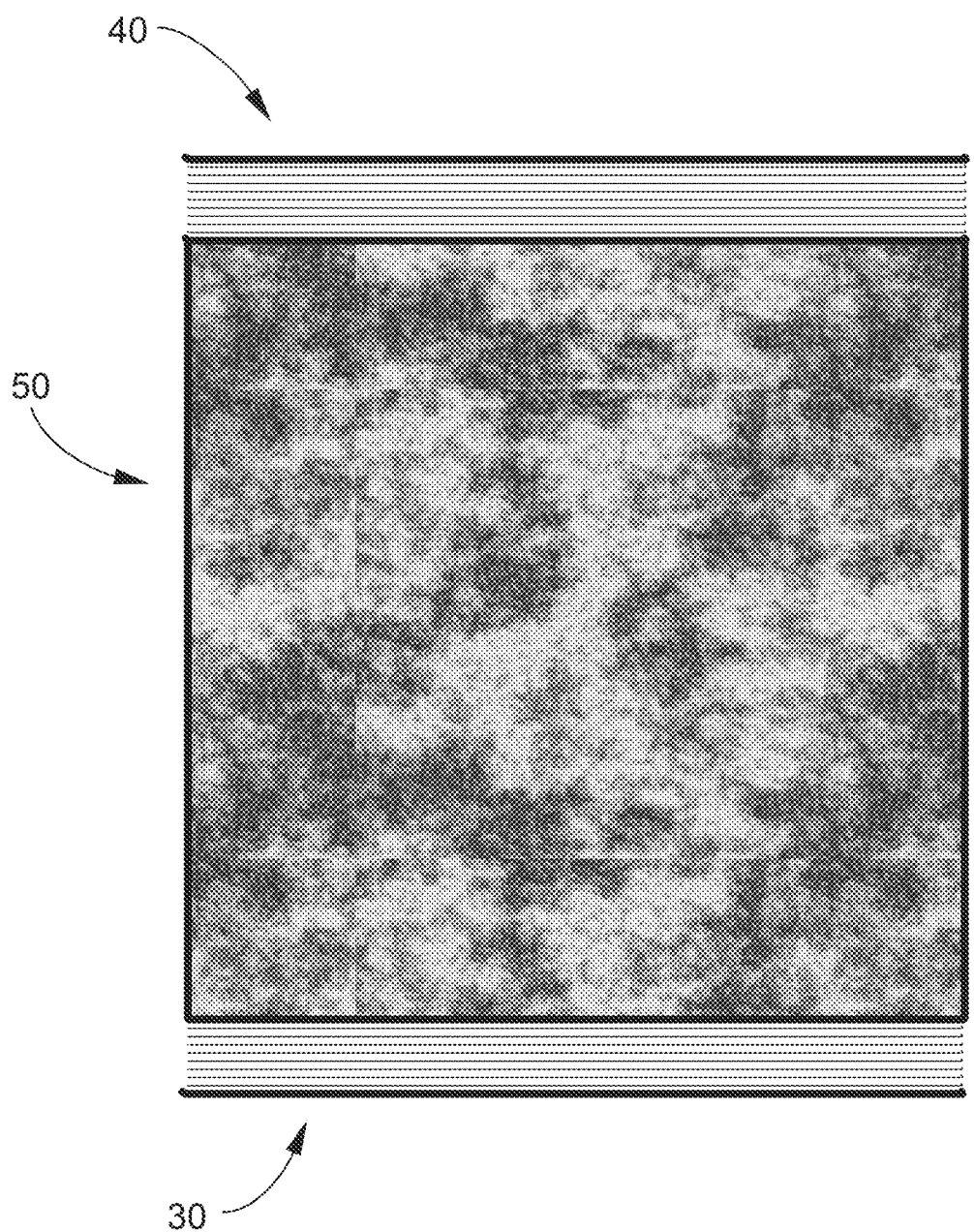
FIG. 25 is a left side view of the assembled unfaced insulated pads.
Figure 26:
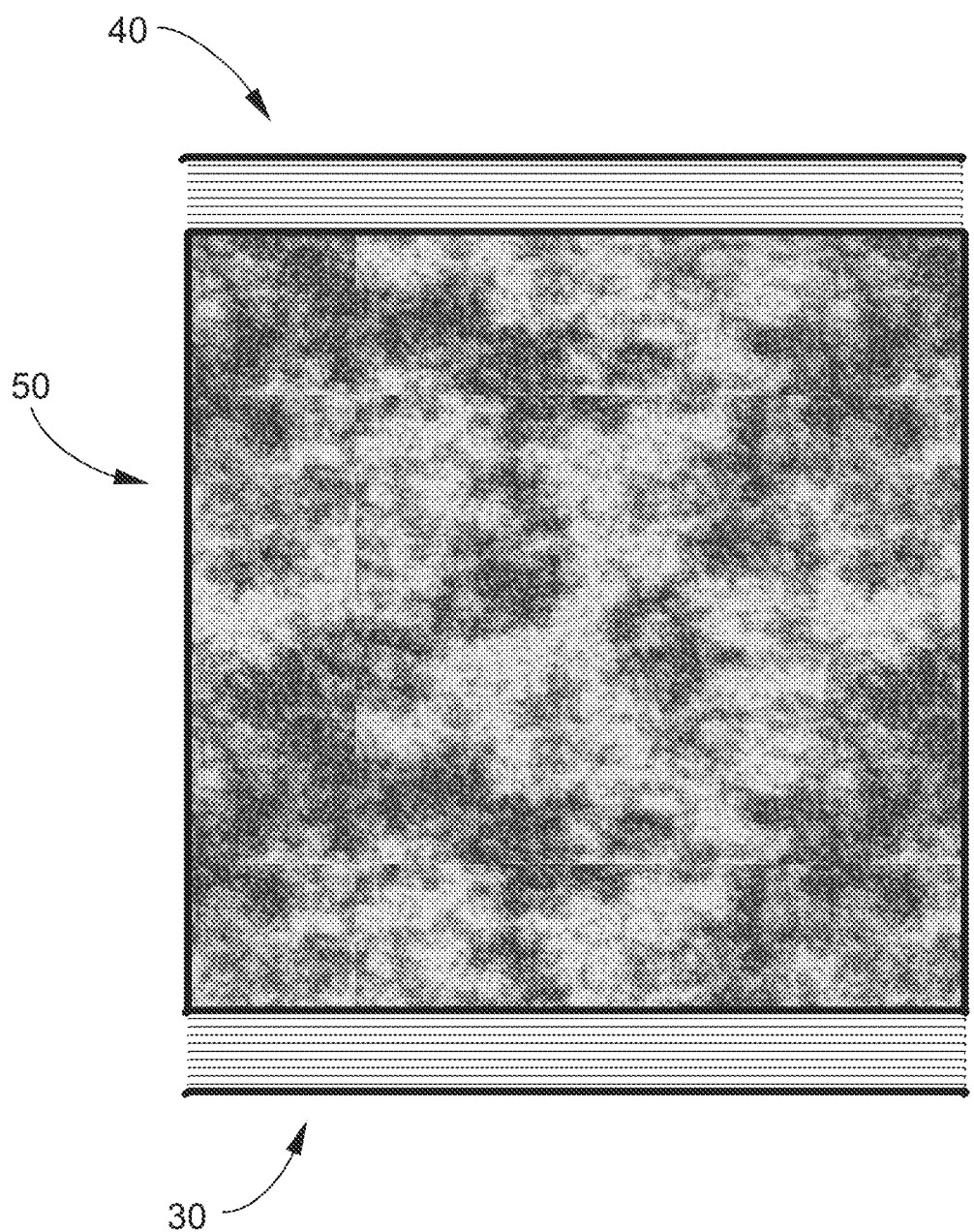
FIG. 26 is a rear side view of the assembled unfaced insulated pads.
Figure 27:
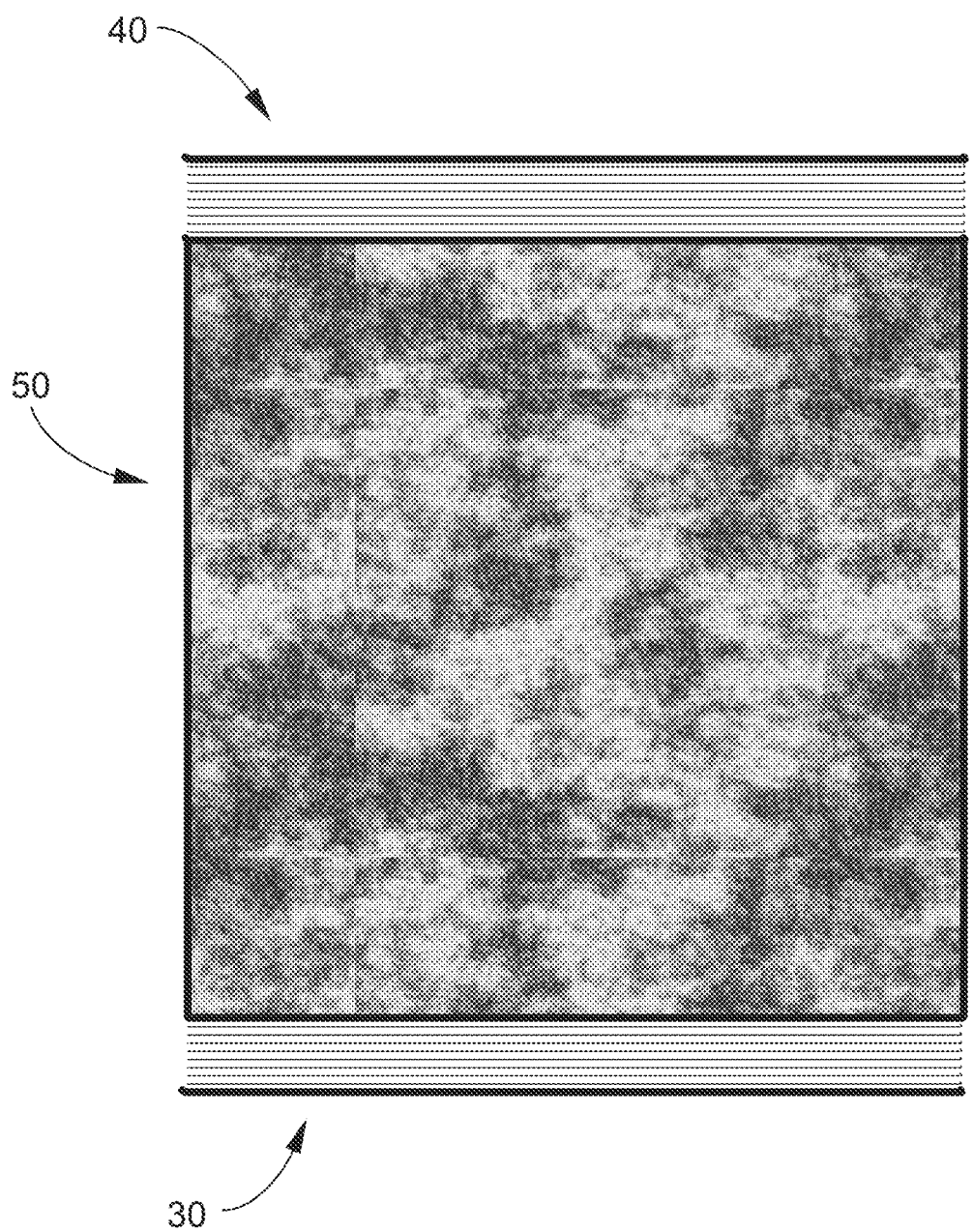
FIG. 27 is a right side view of the assembled unfaced insulated pads.
Figure 28:
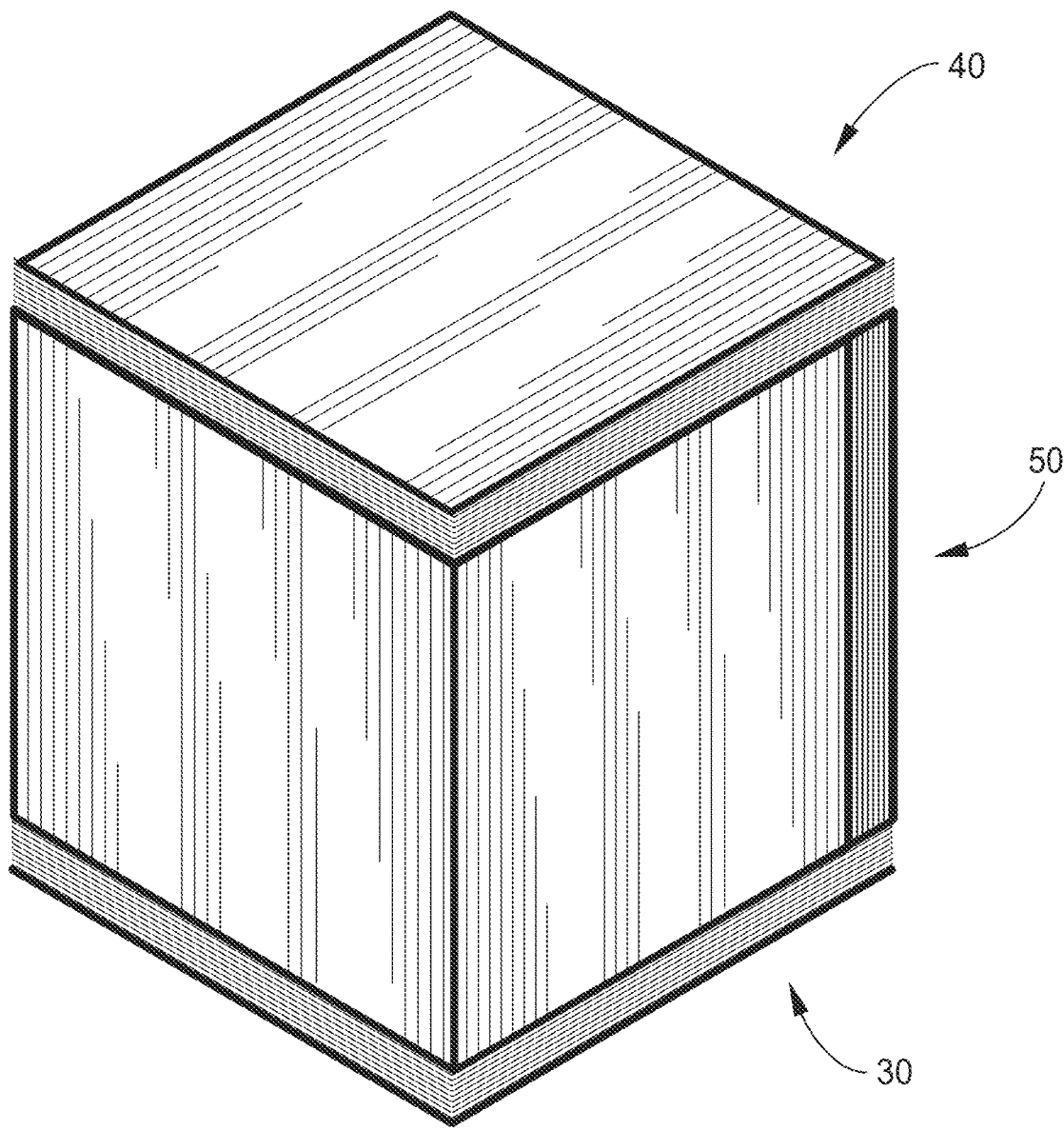
FIG. 28 is a perspective view of the assembled laminated insulated pads.
Figure 29:
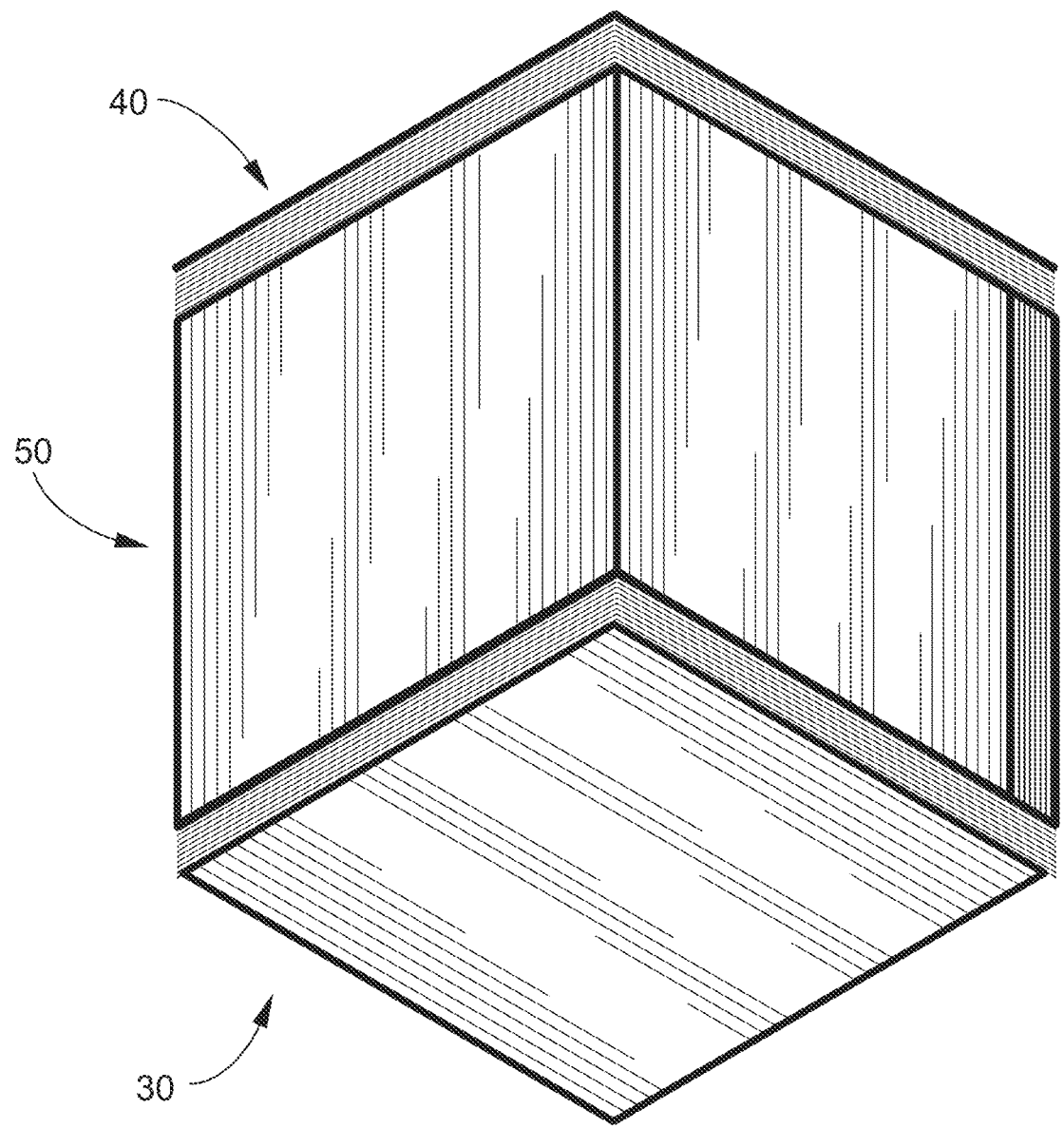
FIG. 29 is a perspective view of the assembled laminated insulated pads.
Figure 30:
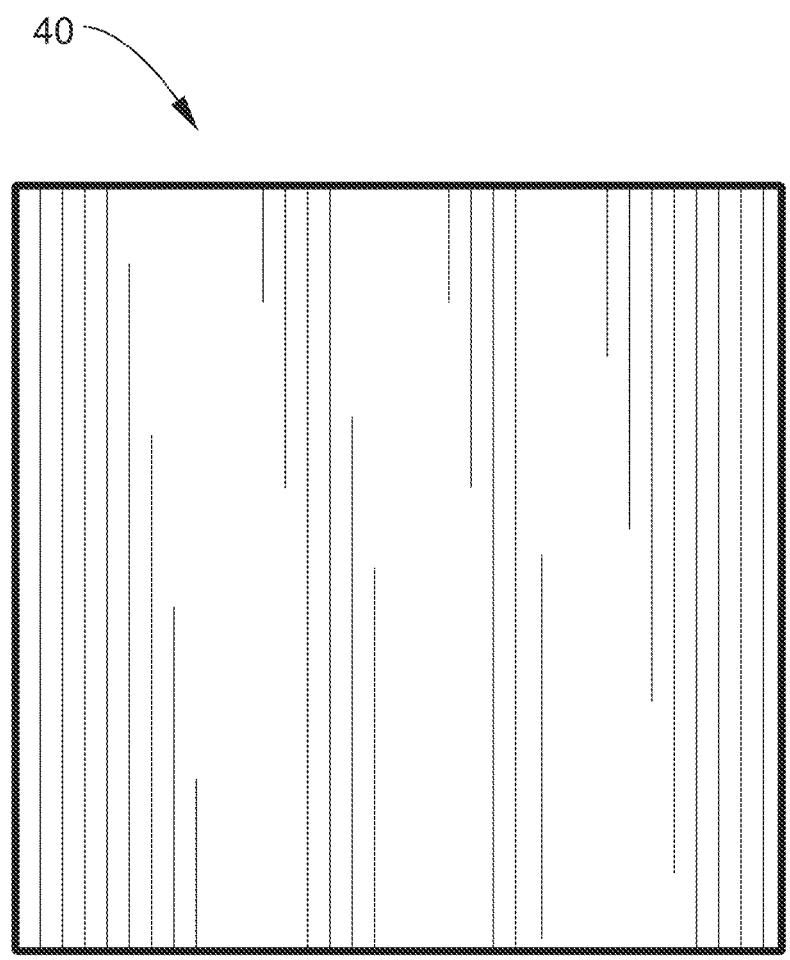
FIG. 30 is a top view of the assembled laminated insulated pads.
Figure 31:
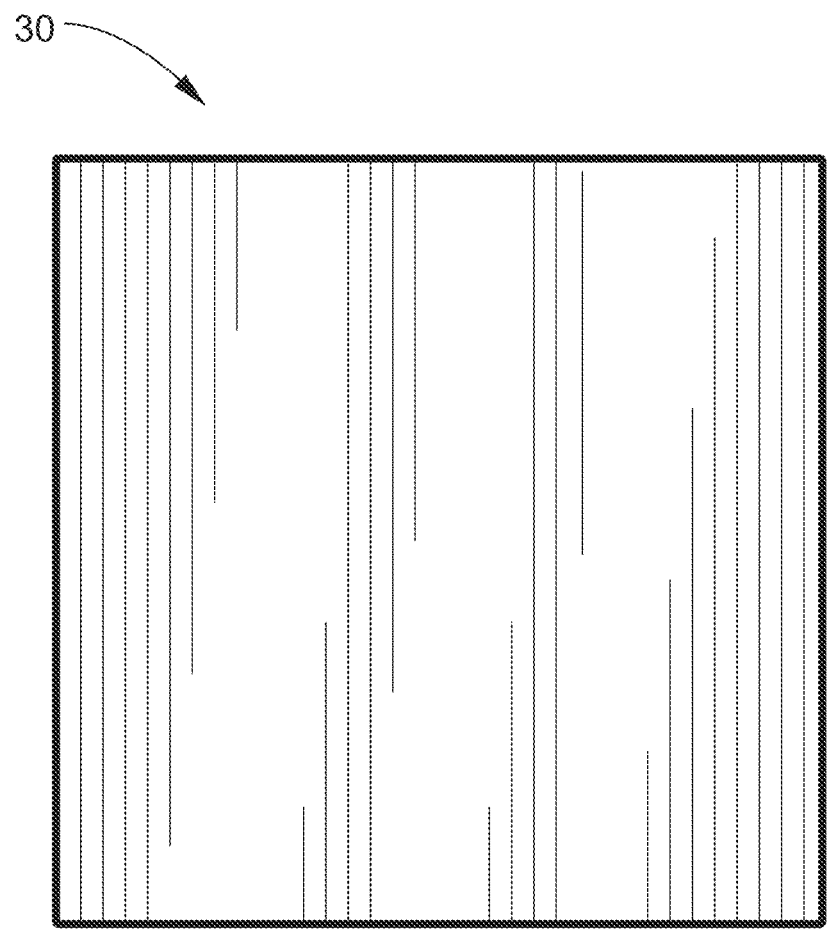
FIG. 31 is a bottom view of the assembled laminated insulated pads.
Figure 32:
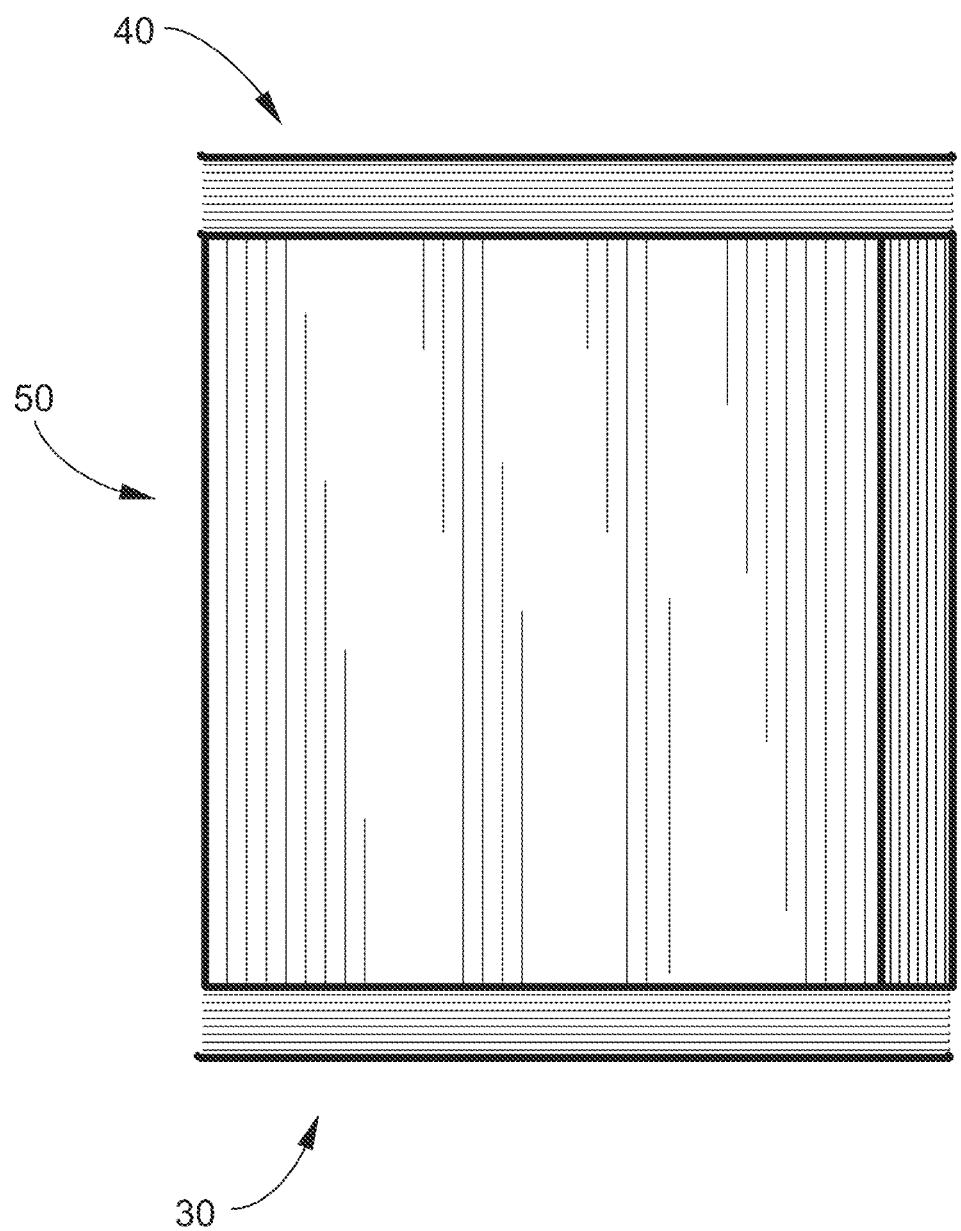
FIG. 32 is a front view of the assembled laminated insulated pads.
Figure 33:
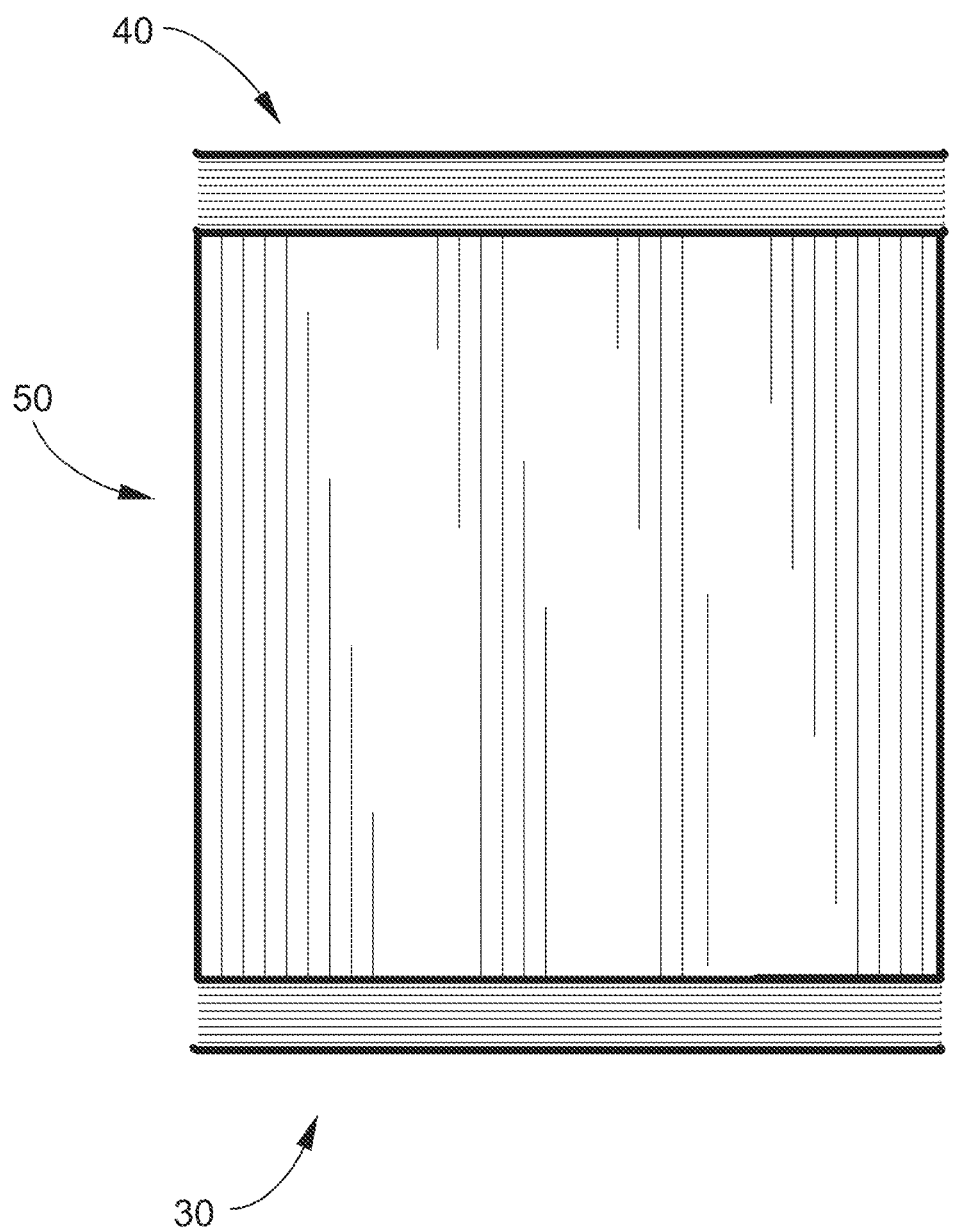
FIG. 33 is a left side view of the assembled laminated insulated pads.
Figure 34:
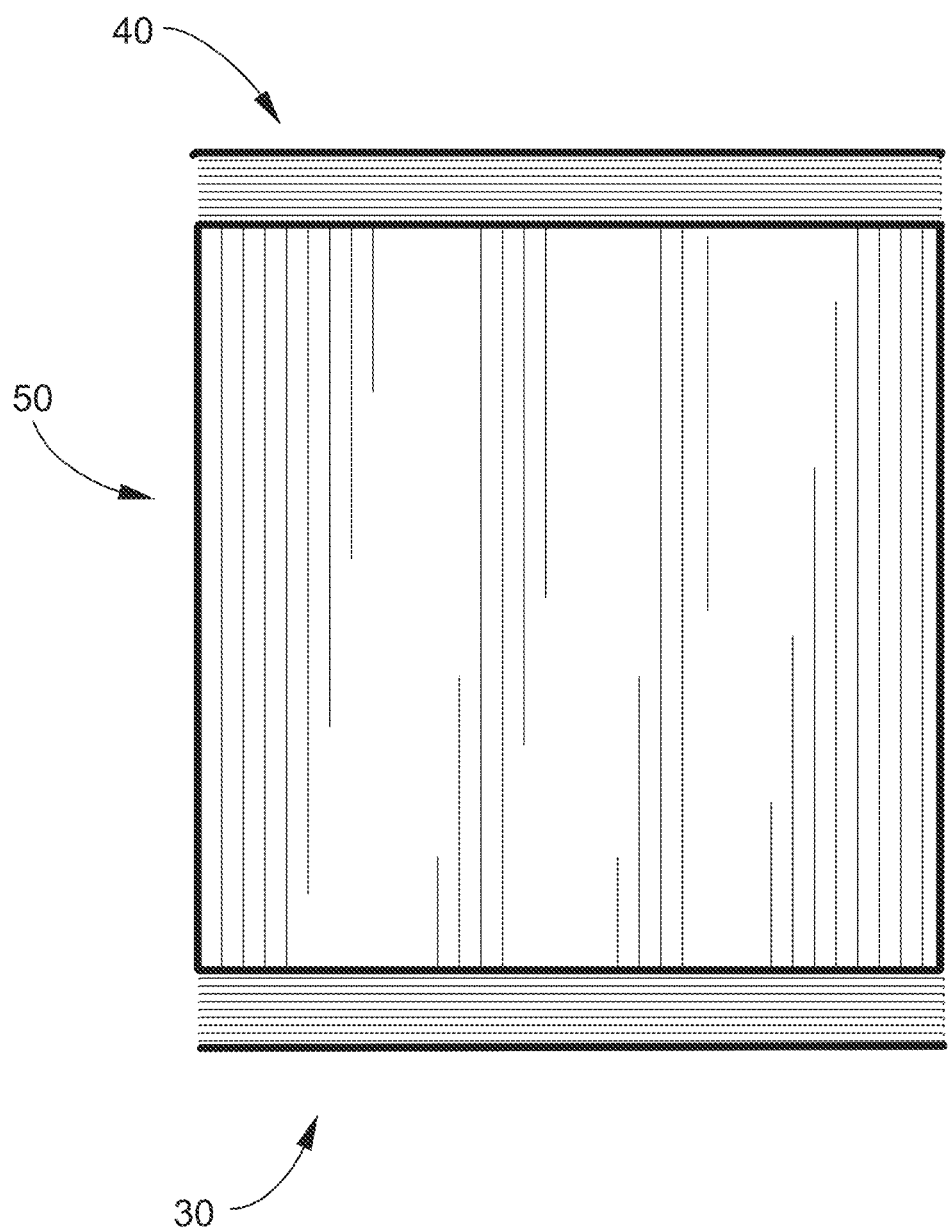
FIG. 34 is a rear side view of the assembled laminated insulated pads.
Figure 35:
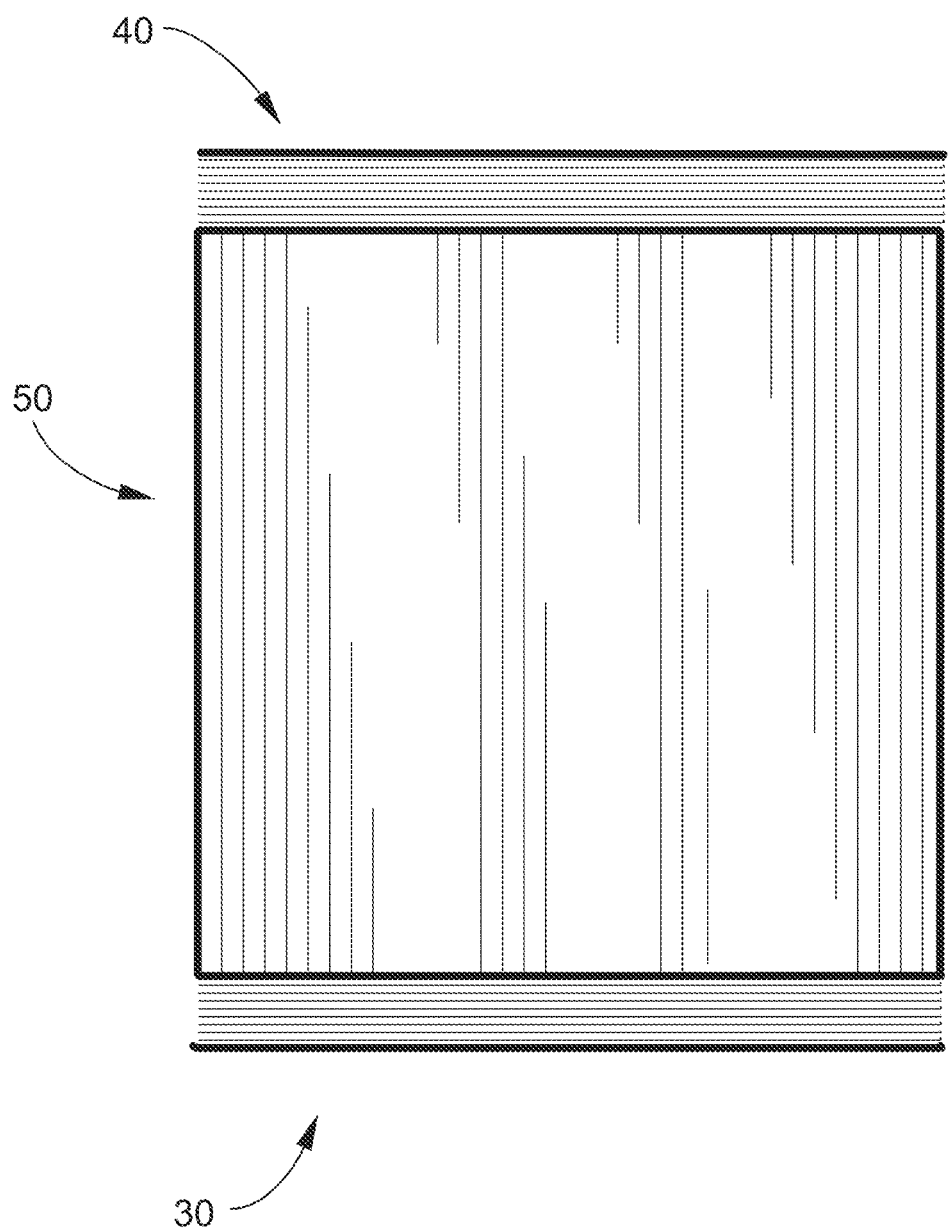
FIG. 35 is a right side view of the assembled laminated insulated pads.

Another embodiment is shown in FIGS. 9 and 10 wherein there is an uninsulated void 70 above the second insulated pad 40. This uninsulated void 70 is created by having the height 54 of the third insulated pad 50, together with the thickness 36 of the first insulated pad, and the thickness 46 of the second insulated pad amounting to less than the height of the rigid container 10. The uninsulated void 70 allows products (not shown) which do not need to be insulated, or which cannot be chilled, to be placed atop the second insulation pad 40 and yet housed within the rigid container 20. For instance, a medical supplier may desire to ship medicine in the insulated portion, within the first, second, and third insulated pads while shipping a syringe and gloves in the uninsulated void. Or, by way of another example, a food supplier may desire to ship meat in the insulated portion, within the first, second, and third insulated pads, while providing stable condiments and utensils in the uninsulated void. The resulting structure minimizes the storage volume needed to be insulated and minimizes the necessity for additional containers for shipment. These advances may have an economic and an environmental advantage.

FIGS. 11-35 show the first, second and third insulated pads 30, 40, 50 in the assembled state without the rigid container. These views show how the three pad design fits together inside the rigid container 10 (not shown in these figures). In particular, FIGS. 11-19 show the embodiment where the insulated pads are encased in poly-wrap. FIGS. 20-27 show the unfaced embodiment of the invention where the insulated pads 30, 40, 50 have neither lamination nor poly-wrap but are characterized by a lack of any outer layer. FIGS. 28-35 show the embodiment where the insulated pads 30, 40, 50 have a surface lamination layer applied on the outer contact surfaces of the respective pads. This lamination may be made from a coffee filter paper, kraft paper, fluted-corrugate paper and the like. It may be printable and have text, images and other indicia thereon. According to this embodiment, the edges of the insulated pads do not have lamination.

An insulated container and method for forming and loading an insulated container according to the invention has been described with reference to specific embodiments and examples. Various details of the invention may be changed without departing from the scope of the invention. Furthermore, the foregoing description of the preferred embodiments of the invention and best mode for practicing the invention are provided for the purpose of illustration only and not for the purpose of limitation, the invention being defined by the claims. It is envisioned that other embodiments may perform similar functions and/or achieve similar results. Any and all such equivalent embodiments and examples are within the scope of the present invention and are intended to be covered by the appended claims.

The foregoing description of preferred embodiments of the present disclosure has been presented for purposes of illustration and description. The described preferred embodiments are not intended to be exhaustive or to limit the scope of the disclosure to the precise form(s) disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the concepts revealed in the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

Any element in a claim that does not explicitly state "means for" performing a specified function, or "step for" performing a specific function, is not to be interpreted as a "means" or "step" clause as specified in 35 U.S.C. § 112, ¶ 6. In particular, the use of "step of" in the claims herein is not intended to invoke the provisions of 35 U.S.C. § 112, ¶ 6.

What is claimed is:

1. An insulated container comprising:
 a rigid container having a bottom, front, rear, left, and right sides, and a selectively closable top side wherein the bottom and top sides have a same length and width as one another, wherein the left and right sides have a same height and width as one another, and wherein the front and rear sides have a same height and width as one another;
 a first insulated pad having a predetermined thickness and density, having a length and a width, and having a perimeter calculated by adding the length and the width and multiplying by two;
 a second insulated pad identical to the first insulated pad; and
 a third insulated pad having the same thickness and density as the first insulated pad, and having a length that is longer than the width of the first insulated pad but is shorter than the perimeter of the first insulated pad;
 wherein the first insulated pad is positioned inside the rigid container in contact with the bottom of the rigid container, wherein the third insulated pad is positioned perpendicular to the first insulated pad and is in contact with the front, rear, left, and right sides of the rigid container, and wherein the second insulated pad is positioned atop the third insulated pad, and
 wherein the first insulated pad comprises a quantity of recycled post-industrial, pre-consumer natural fiber, and synthetic fiber.

2. The insulated container of claim 1 wherein each of the first, second, and third insulated pads further comprises a natural fiber or synthetic lamination layer attached to top and bottom surfaces but not to any edge surfaces of the respective insulated pad.

3. The insulated container of claim 1 wherein each of the first, second, and third insulation pads are characterized by a lack of any covering or lamination on respective top and bottom surfaces.

4. The insulated container of claim 1 further comprising biodegradable or recyclable poly-wrap enclosure around each of the respective first, second, and third insulated pads.

5. The insulated container of claim 4 wherein the term biodegradable means that each of the respective first, second, and third insulated pads will biodegrade completely within one year or less.

6. The insulated container of claim 1 wherein the insulated container is configured to maintain a lower internal temperature for shipment duration when cold packs are used inside the insulated area of the container.

7. The insulated container of claim 1 wherein the height of each one of the front, rear, left, and right sides of the rigid container is the same as a combined height of the thickness of the first and second insulated pads and a width of the third insulated pad.

8. The insulated container of claim 1 wherein the height of each one of the front, rear, left, and right sides of the rigid container is longer than a combined height of the thickness of the first and second insulated pads, and a width of the third insulated pad when the respective first, second, and third pads are positioned in the rigid container, wherein an uninsulated void is formed above the second insulated pad and below the top side of the rigid container.

9. The insulated container of claim 8 further comprising one or more objects positioned in the uninsulated void wherein each one of the one or more objects is stable at ambient temperature.

10. The insulated container of claim 9 wherein the one or more objects placed in the uninsulated void includes one or more of: gloves, syringes, tourniquets, medication, bandages, wipes, napkins, alcohol, paper, printed instructions, kitchen or table utensils, serving ware, cookware, fruit, vegetables, herbs, or seasonings.

11. The insulated container of claim 1 wherein the insulated pads will biodegrade completely when subjected to the conditions set forth in ASTM D5511-18.

12. The insulated container of claim 1 wherein a total number of insulated pads consists of three and only three insulated pads.

13. The insulated container of claim 1 wherein the first insulated pad further comprises a quantity of plant-based fiber.

14. An insulated container comprising:
 a rigid container having a bottom, front, rear, left, and right sides, and a selectively closable top side wherein the bottom and top sides have a same length and width as one another, wherein the left and right sides have a same height and width as one another, and wherein the front and rear sides have a same height and width as one another;
 a first insulated pad having a predetermined thickness and density, having a length and a width, and having a perimeter calculated by adding the length and the width and multiplying by two;
 a second insulated pad identical to the first insulated pad; and
 a third insulated pad having the same thickness and density as the first insulated pad, and having a length that is longer than the width of the first insulated pad but is shorter than the perimeter of the first insulated pad;
 wherein the first insulated pad is positioned inside the rigid container in contact with the bottom of the rigid container, wherein the third insulated pad is positioned perpendicular to the first insulated pad and is in contact with the front, rear, left, and right sides of the rigid container, and wherein the second insulated pad is positioned atop the third insulated pad, and
 wherein the third insulated pad comprises a quantity of recycled post-industrial, pre-consumer natural fiber, and synthetic fiber.

15. The insulated container of claim 14 wherein each of the first, second, and third insulated pads further comprises a natural fiber and/or synthetic lamination layer attached to top and bottom surfaces but not to any edge surfaces of the respective insulated pad.

16. The insulated container of claim 14 wherein each of the first, second, and third insulation pads are characterized by a lack of any covering or lamination on respective top and bottom surfaces.

17. The insulated container of claim 14 further comprising biodegradable or recyclable poly-wrap enclosure around each of the respective first, second, and third insulated pads.

18. The insulated container of claim 17 wherein the term biodegradable means that each of the respective first, second, and third insulated pads will biodegrade completely within one year or less.

19. The insulated container of claim 14 wherein the insulated container is configured to maintain a lower internal temperature for shipment duration when cold packs are used inside the insulated area of the container.

20. The insulated container of claim 14 wherein the height of each one of the front, rear, left, and right sides of the rigid container is the same as a combined height of the thickness of the first and second insulated pads and a width of the third insulated pad.

21. The insulated container of claim 14 wherein the height of each one of the front, rear, left, and right sides of the rigid container is longer than a combined height of the thickness of the first and second insulated pads, and a width of the third insulated pad when the respective first, second, and third pads are positioned in the rigid container, wherein an uninsulated void is formed above the second insulated pad and below the top side of the rigid container.

22. The insulated container of claim 21 further comprising one or more objects positioned in the uninsulated void wherein each one of the one or more objects is stable at ambient temperature.

23. The insulated container of claim 22 wherein the one or more objects placed in the uninsulated void includes one or more of: gloves, syringes, tourniquets, medication, bandages, wipes, napkins, alcohol, paper, printed instructions, kitchen or table utensils, serving ware, cookware, fruit, vegetables, herbs, or seasonings.

24. The insulated container of claim 14 wherein the insulated pads will biodegrade completely when subjected to the conditions set forth in ASTM D5511-18.

25. The insulated container of claim 14 wherein a total number of insulated pads consists of three and only three insulated pads.

26. The insulated container of claim 14 wherein the third insulated pad further comprises a quantity of plant-based fiber.

* * * * *